United States Patent
Goto et al.

(10) Patent No.: US 6,747,782 B2
(45) Date of Patent: Jun. 8, 2004

(54) FARADAY ROTATOR AND OPTICAL ATTENUATOR

(75) Inventors: Masanori Goto, Tokyo (JP); Shinji Iwatsuka, Tokyo (JP); Seiichi Takayama, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/130,740

(22) PCT Filed: Nov. 30, 2001

(86) PCT No.: PCT/JP01/10508
§ 371 (c)(1),
(2), (4) Date: May 21, 2002

(87) PCT Pub. No.: WO02/44798
PCT Pub. Date: Jun. 6, 2002

(65) Prior Publication Data
US 2002/0186447 A1 Dec. 12, 2002

(30) Foreign Application Priority Data
Nov. 30, 2000 (JP) .......................................... 2000-364451
Dec. 14, 2000 (JP) .......................................... 2000-380147

(51) Int. Cl.[7] .............................................. G02F 1/09
(52) U.S. Cl. ........................................ 359/283; 359/282
(58) Field of Search ................................. 359/283, 282, 359/324, 258, 301, 345, 484, 494, 501

(56) References Cited
U.S. PATENT DOCUMENTS
6,417,952 B1 * 7/2002 Kawai et al. ............... 359/282

FOREIGN PATENT DOCUMENTS

| EP | 940704 A2 | * 9/1999 | ............ G02F/1/09 |
| JP | 02077716 A | * 3/1990 | ............ G02B/27/28 |
| JP | 2815509 B | 8/1998 | ............ G02F/1/09 |
| JP | 2000-187193 A | 7/2000 | ............ G02F/1/09 |

* cited by examiner

Primary Examiner—Scott J. Sugarman
Assistant Examiner—Richard Hanig
(74) Attorney, Agent, or Firm—Drinker Biddle & Reath LLP

(57) ABSTRACT

A Faraday rotator and an optical attenuator using the Faraday rotator in which both a fixed magnetic field parallel to and a valuable magnetic field perpendicular to the optical axis are applied to Faraday elements, said optical axis being in the <111> direction of single crystal of garnet, characterized in that three single crystals of garnet of substantially the same thickness having the Faraday effect are used to form Faraday elements and the Faraday elements are arranged in such a manner that a variable magnetic field is applied to one of the Faraday elements, over a range extending 5 deg. each to the left and right of the line connecting the (111) plane in the center of the stereographic projection chart with the (-1-12) plane on the outermost circumference or a plane equivalent thereto in the chart, whereas a variable magnetic field is applied to the remaining two elements, over a range extending 5 deg. each to the left and right of the line connecting the (111) plane in the center of the stereographic projection chart with the (-101) plane on the outermost circumference or a plane equivalent thereto in the chart. Temperature dependence of optical decay thus is improved. Also, positioning means for Faraday rotator improves the polarization dependence loss.

3 Claims, 23 Drawing Sheets

Stereographic projection chart centered on the (111) plane

Single crystal garnet lot 1

(a)

(b)

Single crystal garnet lot 2

(c)

(d)

Single crystal garnet lot 3

| | Crystal Garnet Lot 1 | | Crystal Garnet Lot 2 | | Crystal Garnet Lot 3 | |
|---|---|---|---|---|---|---|
| | No.1-1 | No.1-2 | No.2-1 | No.2-2 | No.3-1 | No.3-2 |
| Peak Current [mA] at 25°C | 50 | 55 | 50 | 55 | 55 | 50 |
| Temperature Variation of attenuation [dB] | 2.69 | 3.17 | 2.5 | 2.78 | 2.6 | 1.94 |

FIG. 8

|  | Crystal Garnet Lot 1 | | | Crystal Garnet Lot 2 | | |
|---|---|---|---|---|---|---|
|  | No.1-1 | No.1-2 | No.1-3 | No.2-1 | No.2-2 | No.2-3 |
| Peak Current [mA] at 25°C | 85 | 65 | 60 | 85 | 90 | 100 |
| Temperature Variation of attenuation [dB] | 7.54 | 2.66 | 8.84 | 6.99 | 3.57 | 6.33 |

Single crystal garnet lot 1

(a)  (b)

Single crystal garnet lot 2

|  | Crystal Garnet Lot 1 | | Crystal Garnet Lot 2 | |
| --- | --- | --- | --- | --- |
|  | No. 1-1 | No. 1-2 | No. 2-1 | No. 2-2 |
| Peak Current [mA] at 25°C | 80 | 90 | 100 | 90 |
| Temperature Variation of attenuation [dB] | 2.11 | 2.24 | 3.13 | 3.75 |

Crystal Garnet Lots (a)

| Garnet crystal lot | N | Max. | Min. | Ave. | S.D. |
|---|---|---|---|---|---|
| No.1 | 22 | 3.19 | 1.06 | 2.31 | 0.55 |
| No.2 | 20 | 3.82 | 1.62 | 2.48 | 0.59 |
| No.3 | 29 | 3.22 | 1.80 | 2.62 | 0.31 |
| No.4 | 36 | 3.87 | 2.20 | 3.14 | 0.39 |
| No.5 | 37 | 4.58 | 2.70 | 3.47 | 0.39 |
| No.6 | 37 | 4.45 | 2.28 | 3.43 | 0.55 |
| No.7 | 33 | 4.53 | 2.18 | 3.11 | 0.49 |
| No.8 | 24 | 3.85 | 2.16 | 3.01 | 0.39 |
| No.9 | 35 | 4.55 | 1.58 | 2.71 | 0.60 |
| No.10 | 20 | 3.05 | 1.07 | 2.14 | 0.49 |
| No.11 | 30 | 3.29 | 1.47 | 2.50 | 0.46 |
| No.12 | 29 | 4.21 | 1.80 | 2.41 | 0.48 |
| No.13 | 29 | 3.28 | 1.30 | 2.01 | 0.47 |
| No.14 | 12 | 3.88 | 2.87 | 3.32 | 0.36 |
| No.15 | 29 | 4.85 | 1.88 | 2.86 | 0.82 |
| No.16 | 22 | 4.10 | 2.23 | 3.26 | 0.52 |
| Total | 444 | 4.85 | 1.06 | 2.85 | 0.67 |

Unit:[dB]

Data of temperature dependent variation due to scatter of quality in products (b)

Symmetrical electromagnets (a)

Asymmetrical electromagnets (b)

Distribution of attenuation in X direction
DR=18.5dB at the center of incidence (a)

Distribution of PDL in X direction
DR=18.5dB at the center of incidence (b)

| Sample | PDL[dB] at Att=18.5dB |
|---|---|
| No.1 | 0.287 |
| No.2 | 0.198 |
| No.3 | 0.269 |
| No.4 | 0.287 |
| No.5 | 0.221 |
| No.6 | 0.153 |
| No.7 | 0.165 |
| No.8 | 0.260 |
| No.9 | 0.303 |
| No.10 | 0.217 |
| No.11 | 0.272 |
| No.12 | 0.289 |
| No.13 | 0.321 |
| No.14 | 0.293 |
| Ave. | 0.252 |
| Max. | 0.321 |
| Min. | 0.153 |

Wavelength: 1550nm
Temperature: 25℃

(a)

(b)

(c)

FARADAY ROTATOR AND OPTICAL ATTENUATOR

INDUSTRIAL FIELD OF THE INVENTION

This invention relates to a device for adjusting the angle of Faraday rotation (Faraday rotator) and also to an optical attenuator using such a device. The Faraday rotation angle-adjusting device and optical attenuator according to the present invention are specifically used in optical transmission communication systems. The invention, in particular, improves the temperature dependence of Faraday rotation angle and narrows the scatter of variations among products in the angle of Faraday rotation with externally applied variable magnetic fields. Moreover, the invention reduces the variable magnetic field required to achieve a desired low-current characteristic or specific amount of attenuation (proportional to the angle of Faraday rotation).

PRIOR ART

Owing to the striking expansion of transmission capacities, there is a growing demand for high-density-wavelength multiplex transmission systems. This has accordingly increased the need for variable optical attenuators that dynamically adjust the quantity of light required for the systems. Applications for the attenuators include the control of light quantities for individual channels and simultaneous attenuation of multiplex light rays. Among those optical attenuators there is one type that utilizes magneto-optical effect. That type usually involves a layout in which a component capable of changing the angle of Faraday rotation a light beam is disposed between a polarizer and an analyzer. With one such component for changing the Faraday rotation angle, external magnetic fields are applied from two or more different directions to a single crystal of garnet having a Faraday effect so as to make the composite external field variable, whereby the Faraday rotation angle of the light that passes through the single crystal of garnet is controlled (Registered Japanese Patent 2,815,509).

To be more specific, the Registered Japanese Patent 2,815,509 discloses an optical attenuator which, while keeping a fixed magnetic field greater than the saturation magnetic field of a single crystal of garnet applied to the crystal in a direction parallel to the optical axis by means of a permanent magnet, applies a variable magnetic field to the crystal in a direction perpendicular to the optical axis by an electromagnet, thereby changes the composite magnetic field vector, and changes the direction of magnetization and hence the Faraday rotation angle of the single garnet crystal so that the quantity of light coupled to the fiber on the leaving side can be controlled.

Another method is known as a means of decreasing the temperature dependence of optical attenuators, which comprises applying external magnetic fields in the directions where the amount of change of the Faraday rotation angle due to the temperature dependence of the angle between the direction of magnetization of Faraday elements and the direction of the beam and the amount of change of the Faraday rotation angle due to the temperature dependence with the Faraday effect are different in code from each other and the absolute value of either amount is less than twice that of the other amount, whereby the changes of Faraday rotation angle with temperature are restricted. (Japanese Patent Application Kokai No. 11-249095).

PROBLEMS THAT THE INVENTION IS TO SOLVE

With the foregoing in view, a plurality of optical attenuators were experimentally fabricated. The experiments presented a problem of wide scatter among the specimens of the temperature dependence values of the attenuation and the electromagnet field perpendicular to the optical axis required to attain the maximum attenuation. Another problem that arose was the requirement of a large variable magnetic field (and hence a large driving current) to achieve a desired attenuation (proportional to the angle of Faraday rotation).

Therefore, the solution of these problems in accordance with the present invention is to provide an optical attenuator that narrows the scatter of characteristics among devices, reduces the temperature dependence, and possesses good low-current characteristics.

Also, in view of the foregoing, we experimentally fabricated a plurality of optical attenuators and found that they show, in common, that an increase in the quantity of attenuation is accompanied with an increase in the polarization dependence loss (hereinafter abbreviated to "PDL") up to more than one decibel at peak. The value is by far the greater than those of non-polarization-dependent optical isolators, the optical devices that similarly take the advantage of magneto-optical effect and are already in wide use with optical transmission systems. Typical PDL values of the non-polarization-dependent optical isolators are of the order of 0.1 dB.

A study of the difference revealed that, when birefringent elements are used as a polarizer and an analyzer, ordinary and extraordinary rays pass through a Faraday element along different paths and accordingly the distributions of magnetic fields that are applied to different portions of the Faraday element vary too. Factors that can subtly influence the magnetic field distributions are, for example, the direction of application of variable magnetic field, shape and size of the yoke of an electromagnet that produces the variable field, and the relative positions of the yoke and Faraday element.

FIG. 22 illustrates, by way of example, a conventional member for attaching a Faraday element to an optical attenuator. The member has a cutout 20 for receiving a yoke and an opening 15 formed in the center for the passage of a light ray. A Faraday element recess 21 is formed at the bottom of the cutout 20 in alignment with the opening 15, and a Faraday element (not shown) consisting of one or more garnet crystal plates is received in the recess. The Faraday element is secured in place with a thermosetting or ultraviolet-curing resin filled in resin-filling ports 16, 17 open to the cutout 20. Yokes 10, 10 of electromagnets are inserted on both sides of the opening 15 into the cutout 20 and are similarly fixed with a hardening resin. There is no means of positioning the inner ends of the yokes 10 of electromagnets, and the yokes simply secured with respect to the Faraday element fail to maintain a constant positional relationship. Moreover, the combined area of the yokes relative to the Faraday element is restricted. These and other factors are deemed responsible for the problem of increased PDL.

Therefore, another problem that the present invention is to solve are settled by the provision of an optical attenuator having favorable PDL characteristics.

MEANS OF SOLVING THE PROBLEMS

The present invention provides a Faraday rotator in which magnetic field is applied to Faraday elements, optical axis of said Faraday elements being in the <111> direction of single crystal of garnet, characterized in that three single crystals of garnet of substantially the same thickness having a Faraday effect are used to form the Faraday elements and the Faraday elements are arranged in such a manner that a first magnetic field is applied to one of the Faraday elements, in the direction perpendicular to a plane in a range extending 5 deg. each to the left and right of the line connecting the (111) plane in the center of a stereographic projection chart with the (−1−12) plane on the outermost circumference or a plane equivalent thereto in the chart, whereas a second magnetic field is applied to the remaining two elements, in the direction perpendicular to plane in a range extending 5 deg. each to the left and right of the line connecting the (111) plane in the center of the stereographic projection chart with the (−101) plane on the outermost circumference or a plane equivalent thereto in the chart. Each of said first and second magnetic fields may be a composite magnetic field formed by a pair of magnetic fields.

The present invention also provides a Faraday rotator in which both a magnetic field parallel to and a magnetic field perpendicular to the optical axis are applied to Faraday elements, said optical axis being in the <111> direction of single crystal of garnet, characterized in that three single crystals of garnet of substantially the same thickness having a Faraday effect are used to form the Faraday elements and the Faraday elements are arranged in such a manner that a first magnetic field is applied to one of the Faraday elements, in the direction perpendicular to a plane in a range extending 5 deg. each to the left and right of the line connecting the (111) plane in the center of the stereographic projection chart with the (−1−12) plane on the outermost circumference or a plane equivalent thereto in the chart, whereas a second magnetic field is applied to the remaining two elements, in the direction perpendicular to a plane in a range extending 5 deg. each to the left and right of the line connecting the (111) plane in the center of the stereographic projection chart with the (−101) plane on the outermost circumference or a plane equivalent thereto in the chart.

The present invention also provides an optical attenuator including a polarizer and an analyzer disposed, respectively, before and after a plurality of Faraday elements, in which a variable magnetic field is applied to Faraday elements, in such manner that the variable magnetic field can change the angle of Faraday rotation of a light beam and control the quantity of light transmitted, said optical axis being in the <111> direction of single crystal of garnet, characterized in that three single crystals of garnet of substantially the same thickness having a Faraday effect are used to form Faraday elements and the Faraday elements are arranged in such a manner that a variable magnetic field is applied to one of the Faraday elements, in the direction perpendicular to planes over a range extending 5 deg. each to the left and right of the line connecting the (111) plane in the center of the stereographic projection chart with the (−1−12) plane on the outermost circumference or a plane equivalent thereto in the chart, whereas a variable magnetic field is applied to the remaining two elements, in the direction perpendicular to planes over a range extending 5 deg. each to the left and right of the line connecting the (111) plane in the center of the stereographic projection chart with the (−101) plane on the outermost circumference or a plane equivalent thereto in the chart.

The variable magnetic field may be a composite magnetic field applied from a pair of magnetic fields at least one of which is variable.

The present invention also provides an optical attenuator including a polarizer and an analyzer disposed, respectively, before and after a plurality of Faraday elements, in which both a magnetic field parallel to and a magnetic field perpendicular to the optical axis are applied to the Faraday elements, one of the magnetic fields being fixed and the other being variable, so that the composite magnetic field thereof can change the angle of Faraday rotation of a light beam and control the quantity of light transmitted, said optical axis being in the <111> direction of single crystal of garnet, characterized in that three single crystals of garnet of substantially the same thickness having a Faraday effect are used to form Faraday elements and the Faraday elements are arranged in such a manner that a variable magnetic field is applied to one of the Faraday elements, in the direction perpendicular to planes over a range extending 5 deg. each to the left and right of the line connecting the (111) plane in the center of the stereographic projection chart with the (−1−12) plane on the outermost circumference or a plane equivalent thereto in the chart, whereas a variable magnetic field is applied to the remaining two elements, in the direction perpendicular to planes over a range extending 5 deg. each to the left and right of the line connecting the (111) plane in the center of the stereographic projection chart with the (−101) plane on the outermost circumference or a plane equivalent thereto in the chart.

In the Faraday rotator and optical attenuator defined above, preferably the magnetic field parallel to the optical axis is a fixed magnetic field generated by permanent magnets and the magnetic field perpendicular to the optical axis is a variable magnetic field generated by electromagnets.

According to the invention, the Faraday rotator is composed of a combination of three Faraday elements of specific orientation, and not only the temperature dependence of Faraday rotation angle is reduced but also the scatter of Faraday rotation characteristics is controlled.

To be more specific, the Faraday rotator and attenuator according to the present invention are limited in temperature variation of the attenuation (that depends on the Faraday rotation angle) and, moreover, the scatter of the attenuation-temperature variation among the specimens is narrow. Furthermore, the scatter of the peak current value (corresponding to the variable magnetic field required to achieve the maximum change in the Faraday rotation angle) among the specimens is small and, in addition, low-current characteristics can be attained (that is, the driving current to generate a variable magnetic field necessary for obtaining a certain amount of attenuation or Faraday rotation angle may be small).

Another Means of Solving the Problems

The present invention also provides an optical attenuator which controls the angle of Faraday rotation of a light beam that passes through a single crystal of garnet having the Faraday effect by applying two external magnetic fields, fixed and variable, from two different directions, characterized in that at least one garnet crystal having the Faraday effect is used as a Faraday element, and a member for holding the Faraday element in place has a stopper to position the front ends of yokes of electromagnets that apply the variable magnetic field to and around the holder, with respect to the direction of field application.

The invention also provides an optical attenuator as defined above characterized in that the member for holding the Faraday element in place has a pair of positioning grooves to position the front ends of yokes of electromagnets that apply the variable magnetic field to and around the holder, with respect to the direction of light beam.

The invention further provides an optical attenuator according to claim 1 characterized in that the yokes of the electromagnets that apply the variable magnetic field have a front end plane each perpendicular to the direction of the variable field with a cross sectional area no less than 1.7 times that of the plane of the Faraday element perpendicular to the direction of the variable field.

To be more concrete, the invention provides an optical attenuator comprising a member formed with a first groove extending across the optical axis and also formed with an opening open to the first groove along the optical axis, a Faraday element disposed in the first groove in alignment with the optical axis, said member having a pair of second grooves formed on both sides of, and close to, the Faraday element, said second grooves extending across the first groove and in the direction normal to the optical axis, and a pair of electromagnets that produces a variable magnetic field, said magnets having yokes the ends of which are fitted in the pair of second grooves on both sides of the Faraday element, the bottoms of the second grooves serving as a stopper for positioning the front ends of the yokes.

BRIEF EXPLANATION OF THE DRAWINGS

FIG. 6 is a table giving the characteristics of optical attenuator specimens, i.e., their peak current values and maximum values of attenuation variation over the temperature range of 0–65° C., when a variable magnetic field was applied to one of the three single crystals of garnet in each specimen, over the line connecting the (111) plane in the center with the (−1−12) plane on the outermost circumference of the stereographic projection chart, whereas a variable magnetic field was applied to the remaining two elements, over the line connecting the (111) plane in the center with the (−101) plane on the outermost circumference of the chart.

FIG. 8 is a table giving the characteristics of optical attenuator specimens, i.e., their peak current values and maximum values of attenuation variation over the temperature range of 0–65° C., when a variable magnetic field was applied to all three Faraday elements of each specimen, on the line connecting the (111) plane in the center with a plane inclined at an angle of 26° from the (−1−12) plane on the outermost circumference toward the (−101) plane of the stereographic projection chart.

FIG. 10 is a table giving the characteristics of optical attenuator specimens, i.e., their peak current values and maximum values of attenuation variation over the temperature range of 0–65° C., when a variable magnetic field was applied to one of the three single crystals of garnet in each specimen, over the line connecting the (111) plane in the center with the (−1−12) plane on the outermost circumference of the stereographic projection chart, whereas a variable magnetic field was applied to the remaining two elements, over the line connecting the (111) plane in the center with the (−211) plane on the outermost circumference of the chart.

PREFERRED EMBODIMENTS OF THE INVENTION

In the following, preferred embodiments are described. It is noted that the embodiments are described in connection with a composite magnetic field composed of two magnetic fields, one being fixed and the other being variable, it should be noted that so long as the desired vector of variable magnetic field may be generated a single electromagnet or a plurality of electromagnets, or a combination of permanents and electromagnets may be adopted. In the following, it should be understood that although the direction of the composite magnetic field is not specified the direction is in perpendicular to the plane designated by the crystallographic planes. That is, a statement that a variable magnetic field is applied in over a line connecting the (111) plane to (k,l,m) (k, l, m are specific integers) means that the magnetic field is applied in the direction between <111> (inclusive) and <k,l,m> (inclusive).

Figure 1:
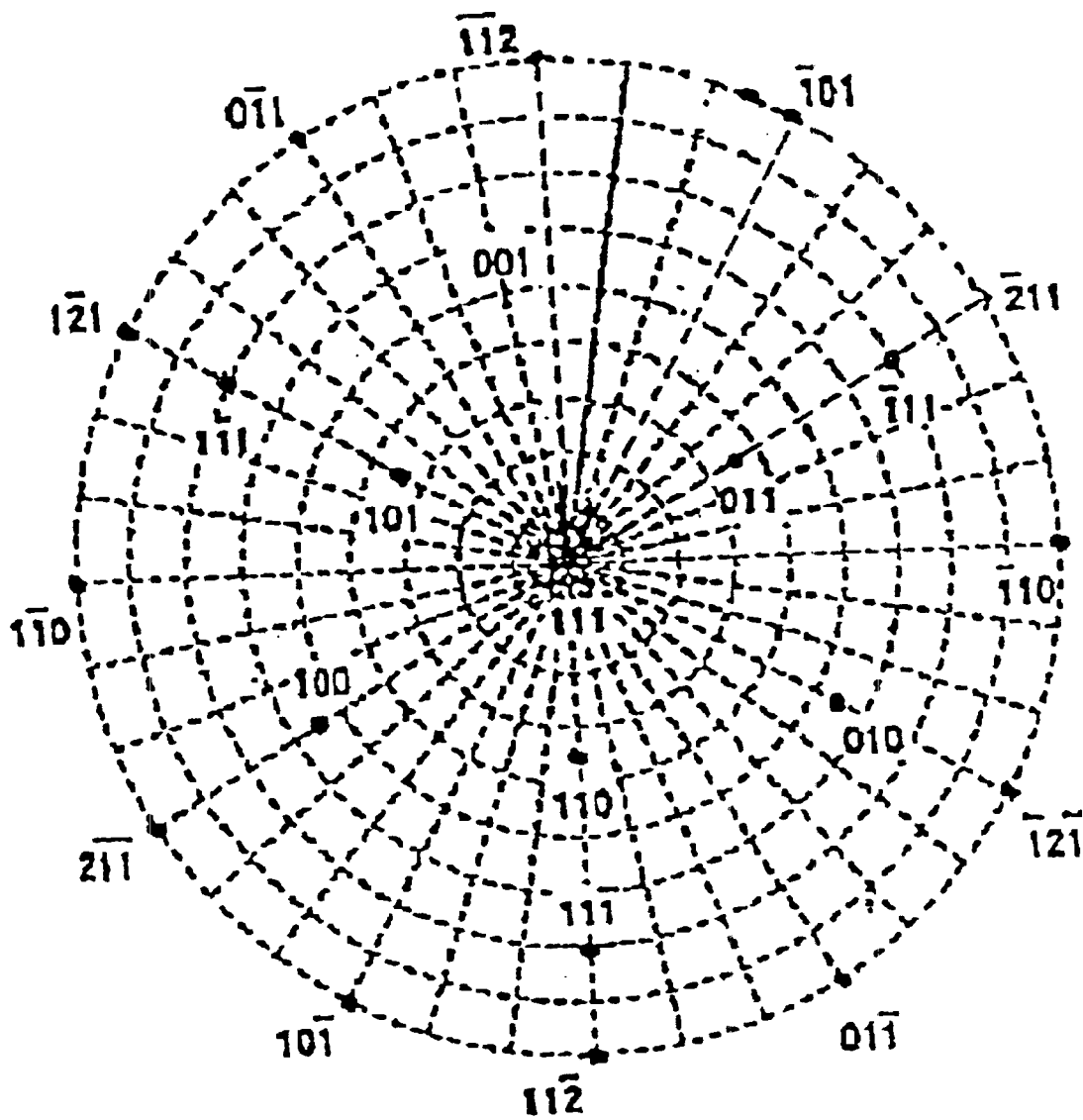
FIG. 1 is a stereographic projection chart of crystal faces centered on the (111) plane.

In accordance with the present invention, Faraday elements are arranged in such a way that a variable magnetic field of electromagnets is applied to one of three elements, over the line connecting the (111) plane in the center with the (−1−12) plane on the outermost circumference of the stereographic projection chart, whereas a variable magnetic field is applied to the remaining two elements, over the line connecting the (111) plane in the center with the (−101) plane on the outermost circumference of the chart. FIG. 1 is a stereographic projection chart centered on the (111) plane of a single crystal of garnet. Any given plane of the garnet crystal may be represented by a dot in this stereographic projection chart. Owing to the symmetry of the crystal structure, a plane equivalent to the (−1−12) plane emerges at every 120 deg. on the outermost circumference, and a plane equivalent to the (−101) plane comes at every 60 deg. Here the plane equivalent to the (−1−12) plane is either the (−12−1) or (2−1−1) plane and the plane equivalent to the (−101) plane is any of the (−110), (01−1), (10−1), (1−10), and (0−11) planes. Negative indices of the crystal planes are indicated by indices each with a minus symbol.

Figure 2:
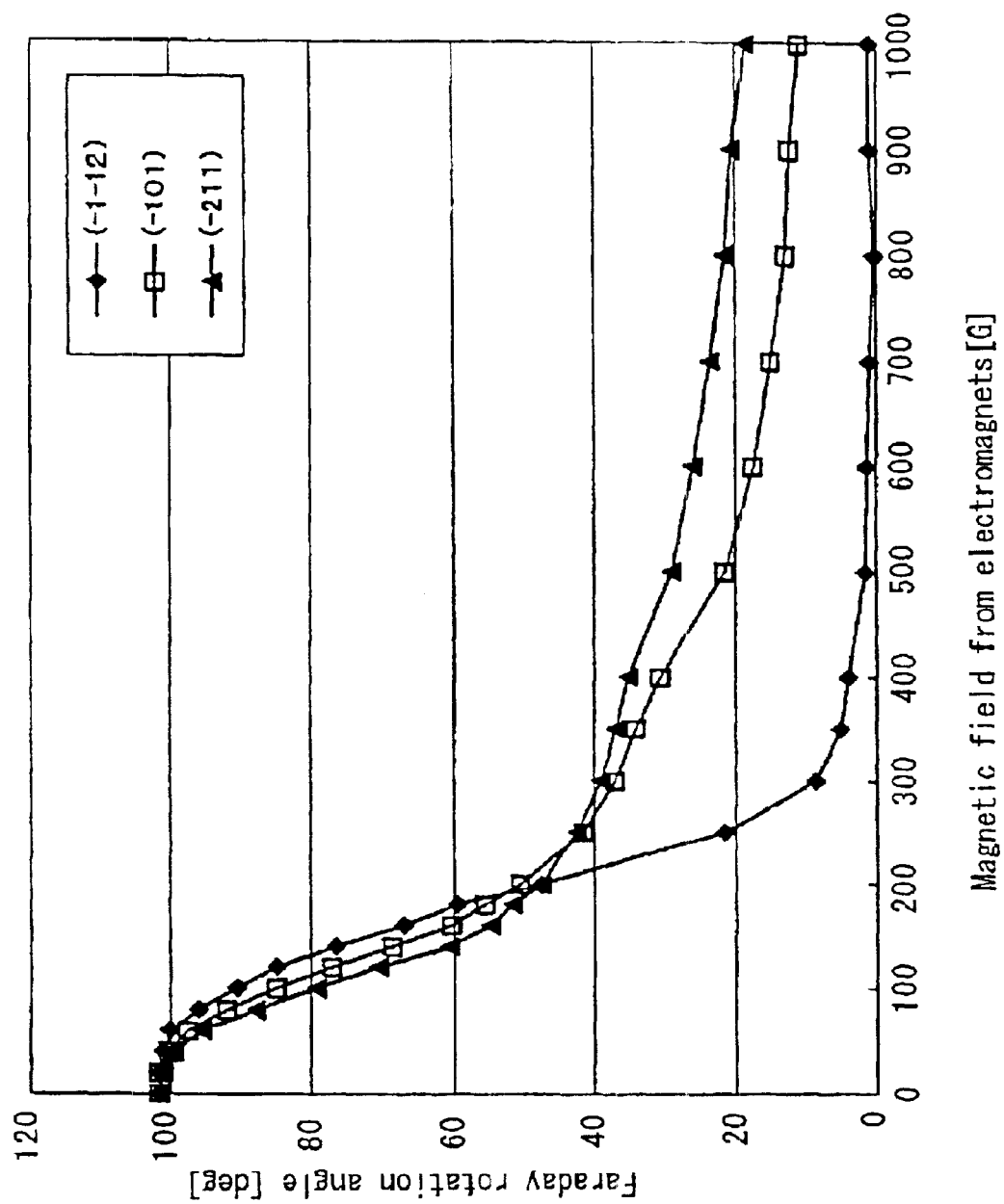
FIG. 2 is a graphic representation of the relation between the electromagnet field and Faraday rotation angle in the route of magnetization rotation.

FIG. 2 graphically represents the results of measurement of Faraday rotation angle and magnetic field in the directions of electromagnet field application with different garnet crystal orientations. The graph reveals that the Faraday rotation angle varies widely with the electromagnet field depending on the direction of magnetic field application. Thus the reproducibility of attenuation characteristics with the applied variable magnetic field can be enhanced by distinctly specifying the relation between the orientation of garnet single crystal and the direction of electromagnet field applicable to the garnet crystal. It has now been found possible to reduce with good reproducibility the temperature dependence of the attenuation characteristics with the applied variable magnetic field, when, in conformity with the invention, a variable magnetic field is applied to one of the three single crystals of garnet in each specimen, over the line connecting the (111) plane in the center with the (−1−12) plane on the outermost circumference of the stereographic projection chart, whereas a variable magnetic field is applied to the remaining two elements, over the line connecting the (111) plane in the center with the (−101) plane on the outermost circumference of the chart.

As will be clear from a comparison between the Examples of the invention and Comparative Examples to be given below, the narrowing of scatter of the temperature dependence of attenuation according to the invention is presumably attributable to the greater tolerance than in the prior art of the angular deviation of different directions of magnetic fields that are applied to specific orientations.

Figure 3:
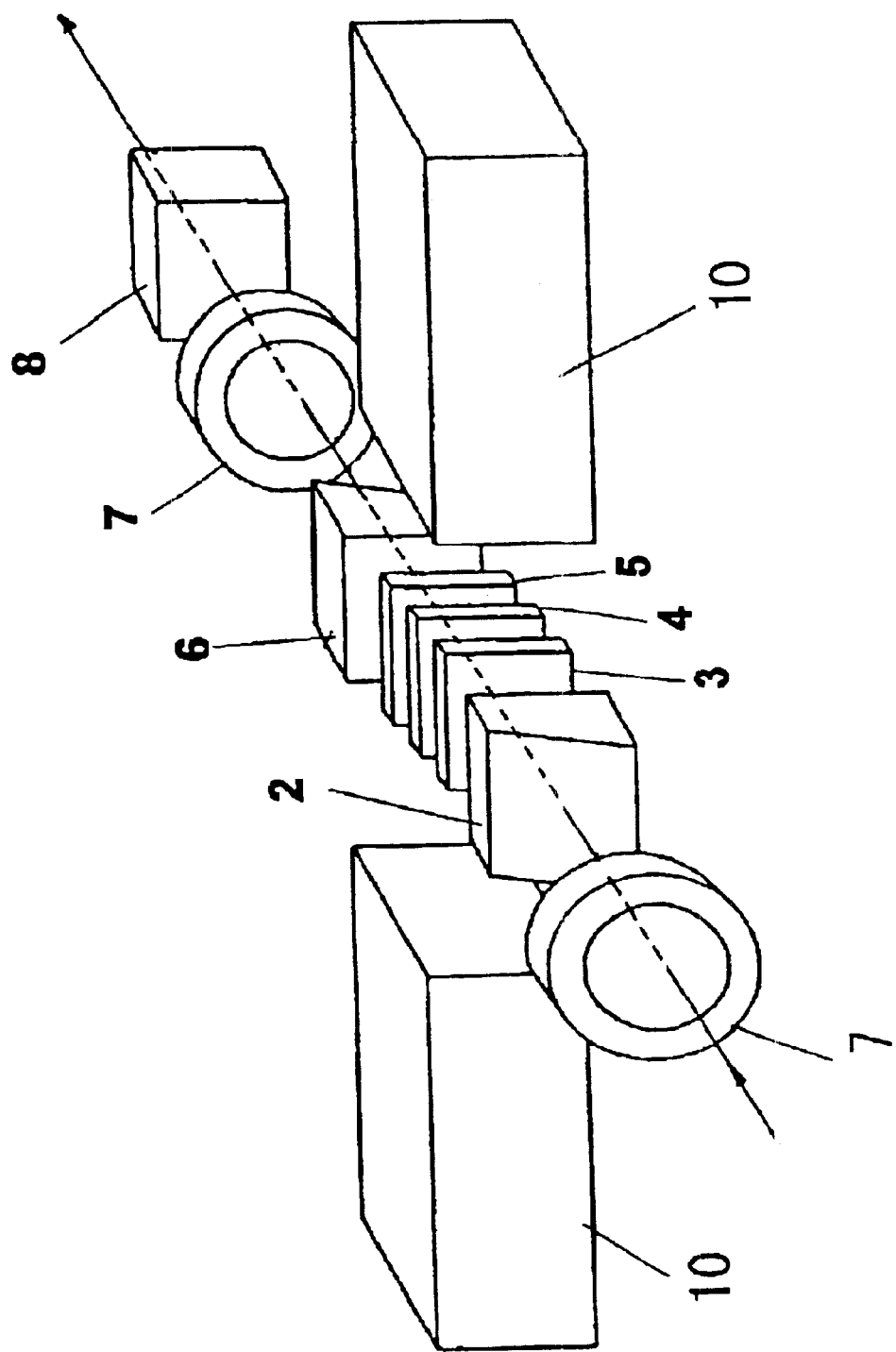
FIG. 3 is a perspective view showing the construction of an optical attenuator.

FIG. 3 illustrates the basic construction of a Faraday rotator comprising a combination of three Faraday elements and two different magnets and of an optical attenuator using the rotator. The arrangement is such that a light beam travels, from the beam incidence side forward, through a polarizer 2, a set of three Faraday elements 3, 4, 5 as defined above, an analyzer 6, and a phase compensation prism 8, in the order of mention. To the Faraday elements 3, 4, 5 is applied a fixed saturation magnetic field in the optical axis by permanent magnets 7, 7. Also, a variable magnetic field is applicable in the direction normal to the optical axis by electromagnets 10, 10. These three Faraday elements and two kinds of magnets are joined to constitute a Faraday rotator.

EXAMPLE 1

An optical attenuator of the basic construction shown in FIG. 3 was made, and the relation between the direction of application of electromagnet field and the orientation of garnet crystal, the relation between the amount of attenuation and electromagnet field, and the temperature dependency were examined. The arrangement was such that a beam of light could pass through a polarizer, a plurality of Faraday elements, an analyzer, and a phase compensation prism, located in the order of mention. The Faraday elements were arranged so that the light beam was incident perpendicularly to the (111) planes of the elements. A magnetic field parallel to the light beam was applied by two permanent magnets to the Faraday elements, while electromagnets applied a magnetic field perpendicular to the beam. As the Faraday rotator was kept in the state of magnetic saturation, the current being supplied to the electromagnets was varied so as to change continuously the angle of Faraday rotation of the beam being transmitted and accordingly change the quantity of light of the leaving beam. The relative angle of the polarization planes of the polarizer and analyzer through which the beam was to pass was set to 105 deg.

Figure 4:
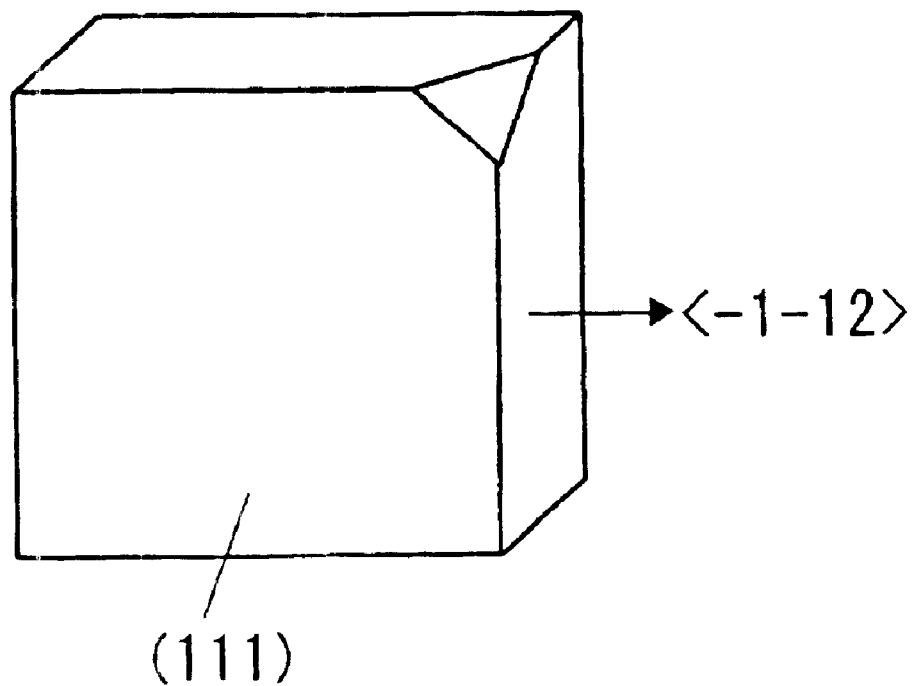
FIG. 4 is a schematic view of a 1-mm cubic single crystal of garnet as beveled.

The Faraday element was fabricated in the following way. A single crystal of garnet was grown on a nonmagnetic garnet substrate by the liquid phase epitaxial technique. With reference to the orientation flat surface formed on the nonmagnetic garnet substrate, the resulting crystal was slitted at intervals of 11 mm in parallel with and perpendicularly to the <−1−12> direction, and the upper right corner of the side of each slitted piece normal to the <−1−12> direction was beveled. Next, the substrate was removed by grinding, and the semifinished pieces were heat treated at 1030° C. in air for 20 hours. The heat treatment was done for the purpose of reducing the growth induced magnetic anisotropy. The pieces were then mirror polished to a finish thickness at which the angle of Faraday rotation was about 32 deg. Following this, nonreflective films were formed on both sides of the pieces. Next, the 11 mm-square garnet single crystal pieces formed with the nonreflective films were cut into chips 1 mm square in the directions parallel to and perpendicular to the four sides of each piece. The upper right of the side perpendicular to the <−1−12> direction of each chip was beveled (FIG. 4). The beveling was intended to make the crystal orientation of each chip after the scission distinct. Three such 1 mm-square chips of garnet single crystal were used as Faraday elements.

Two optical attenuators each of three different garnet single crystal lots were made. In each attenuator Faraday elements were arranged in such a way that a variable magnetic-field was applicable to one of the three elements, over the line connecting the (111) plane in the center with the (−1−12) plane on the outermost circumference of the stereographic projection chart, whereas a variable magnetic field was applicable to the remaining two elements, over the line connecting the (111) plane in the center with the (−101) plane on the outermost circumference of the chart.

Figure 5:
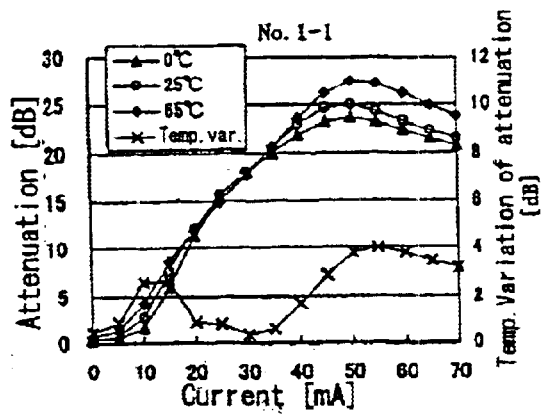
FIG. 5 gives graphs showing the characteristics of optical attenuator specimens, i.e., their values of temperature dependence on attenuation-current characteristics values, when a variable magnetic field was applied to one of the three single crystals of garnet in each specimen, over the line connecting the (111) plane in the center with the (−1−12) plane on the outermost circumference of the stereographic projection chart, whereas a variable magnetic field was applied to the remaining two elements, over the line connecting the (111) plane in the center with the (−101) plane on the outermost circumference of the chart.
Figure 5:
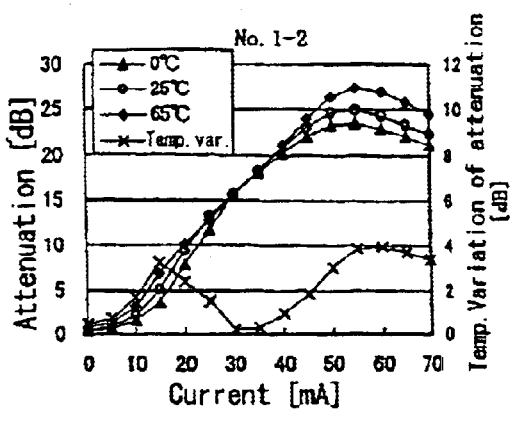
Figure 5:
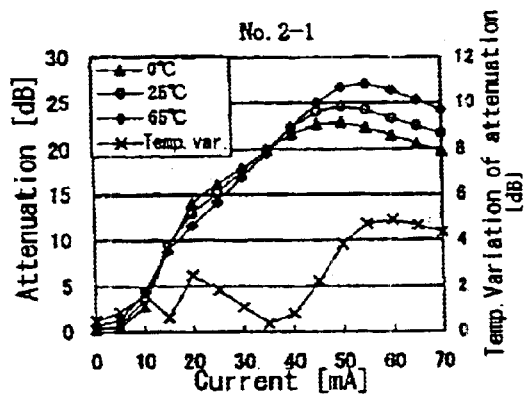
Figure 5:
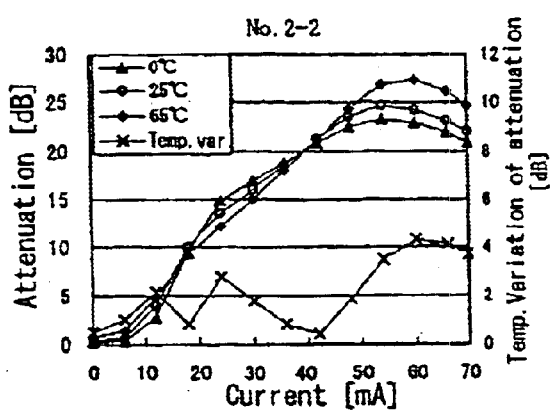
Figure 5:
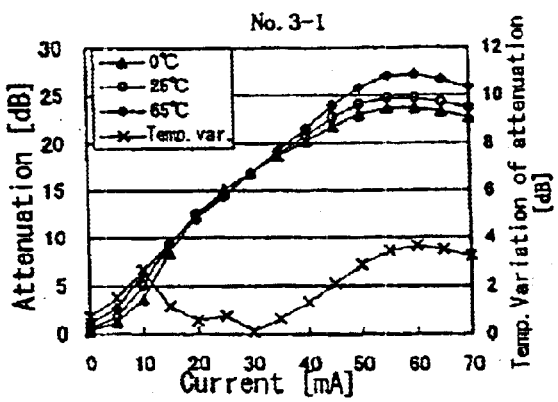
Figure 5:
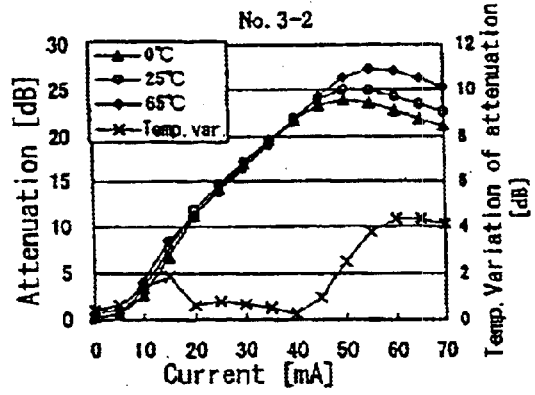

The temperature dependence values (at 0°, 25°, and 65° C.) of the attenuation-current characteristics of these test specimens were measured. The results are shown in FIG. 5. The attenuation-current characteristics and temperature dependence tendencies were quite favorably reproduced by the individual specimens. The graphs also indicate the attenuation-temperature variations as computed from the measured values of attenuation.

With each specimen the peak current at which the peak of attenuation at 25° C. was attained and the maximum value of the variation in attenuation over the range of 0–65° C. at attenuation below 20 dB were determined. The results are summarized in FIG. 6. With the individual samples the attenuation-current characteristics and temperature dependence values were reproduced with very good results.

Comparative Example 1

Figure 7:
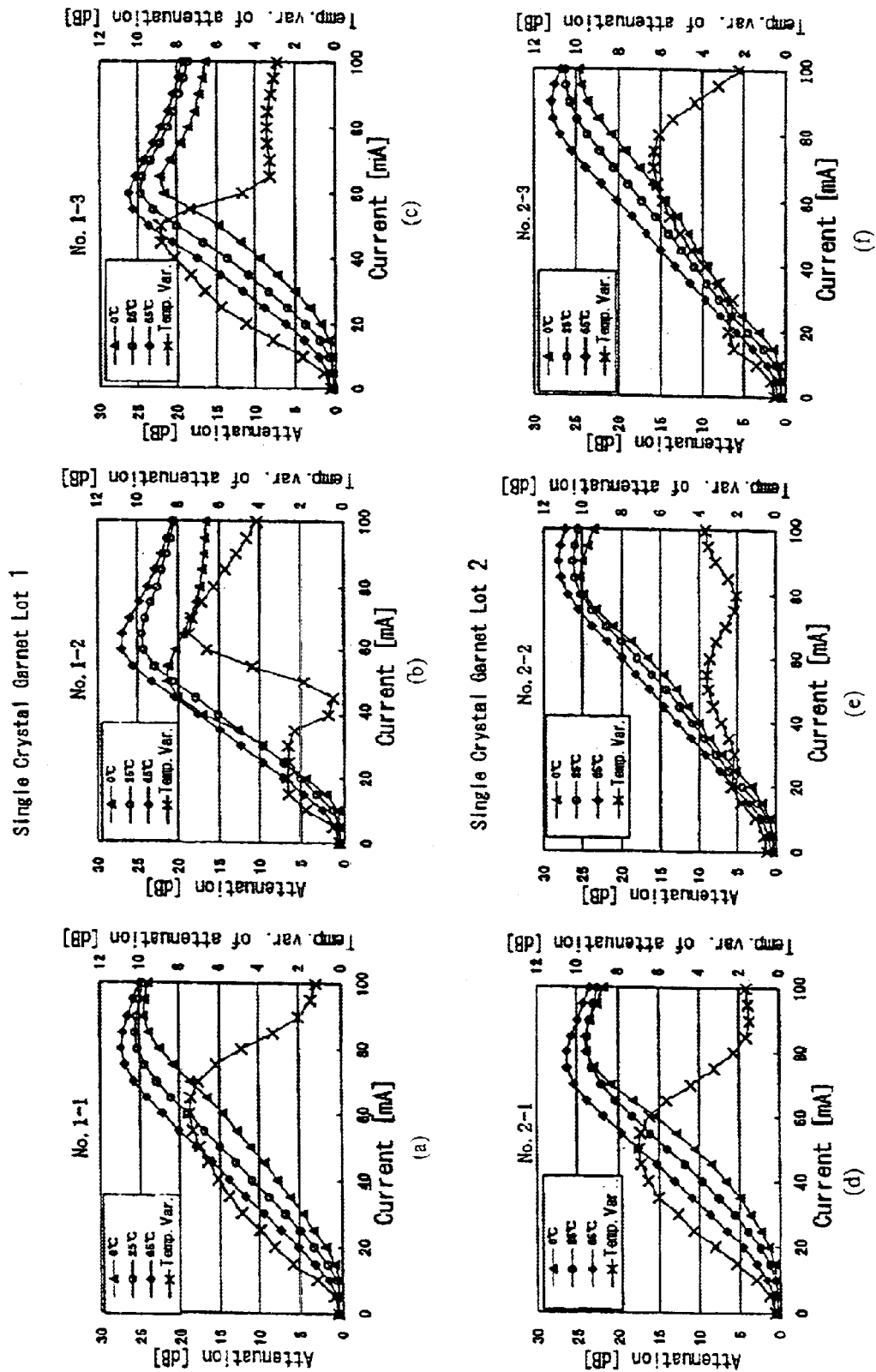
FIG. 7 gives graphs showing the characteristics of optical attenuator specimens, i.e., their values of temperature dependence on attenuation-current characteristics values, when a variable magnetic field was applied to all three Faraday elements of each specimen, on the line connecting the (111) plane in the center with a plane inclined at an angle of 26° from the (−1−12) plane on the outermost circumference toward the (−101) plane of the stereographic projection chart.

As Comparative Example 1, optical attenuators were made with a Faraday element arrangement such that electromagnet fields were applicable in different orientations. The Faraday elements were arranged so that all three were superposed in the same orientation and an electromagnet field was applicable to the line connecting the (111) plane in the center with a plane inclined at an angle of 26° from the (−1−12) plane on the outermost circumference toward the (−101) plane of the stereographic projection chart. Three optical attenuators were made each from two different garnet single crystal lots, and the temperature dependence values (at 0°, 25°, and 65° C.) of the attenuation-current characteristics of these test specimens were measured. The results are shown in FIG. 7.

With each specimen the peak current at which the peak of attenuation at 25° C. was attained and the maximum value of the variation in attenuation over the range of 0–65° C. at attenuation below 20 dB were determined. The results are summarized in FIG. 8. The graphs indicate that, with the individual samples, the peak current and temperature dependence varies widely from specimen to specimen.

It is obvious from the foregoing that in the Example of the present invention not only the attenuation-temperature variation is limited but also the scatter of the attenuation-temperature variation among the specimens tested was small. In addition, the scatter of peak current values (corresponding to the variable magnetic fields required to obtain the maximum change in the angle of Faraday rotation) is restricted and, moreover, low-current characteristics are obtained (which means that the amount of a driving current to produce a variable magnetic field required to obtain a specific attenuation amount or angle of Faraday rotation can be kept small).

Comparative Example 2

Figure 9:
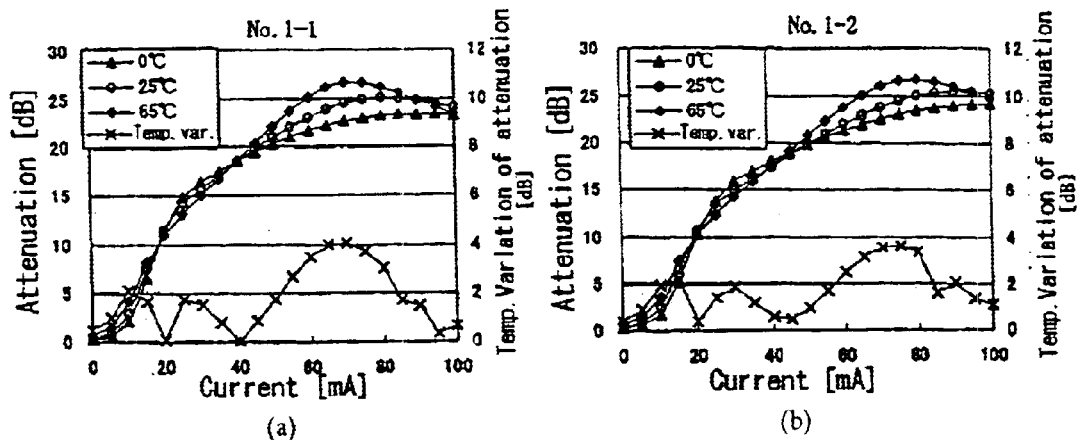
FIG. 9 gives graphs showing the characteristics of optical attenuator specimens, i.e., their values of temperature dependence on attenuation-current characteristics values, when a variable magnetic field was applied to one of the three single crystals of garnet in each specimen, over the line connecting the (111) plane in the center with the (−1−12) plane on the outermost circumference of the stereographic projection chart, whereas a variable magnetic field was applied to the remaining two elements, over the line connecting the (111) plane in the center with the (−211) plane on the outermost circumference of the chart.
Figure 9:
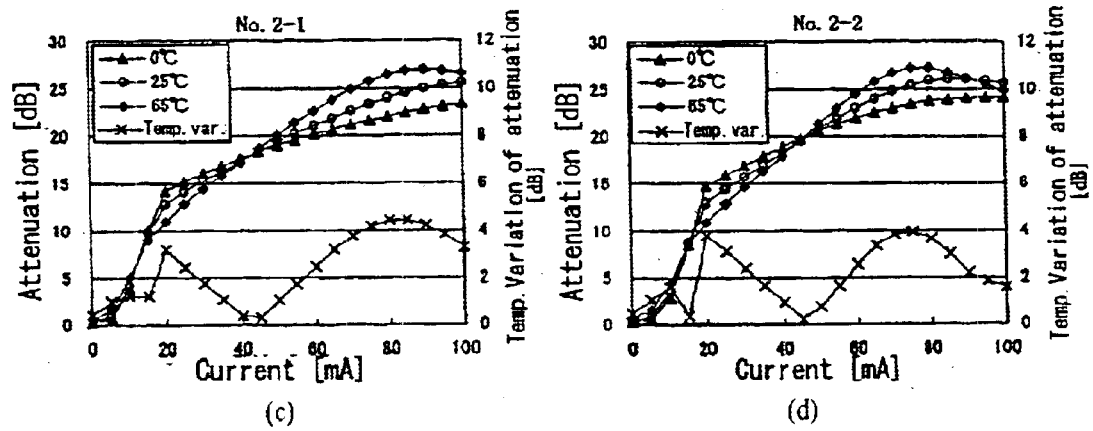

As Comparative Example 2, a plurality of optical attenuators of varied garnet single crystal lots were made. In each attenuator Faraday elements were arranged in such a way that a variable magnetic field was applicable to one of the three elements, over the line connecting the (111) plane in the center with the (−1−12) plane on the outermost circumference of the stereographic projection chart, whereas a variable magnetic field was applicable to the remaining two elements, over the line connecting the (111) plane in the center with the (−211) plane on the outermost circumference of the chart. The temperature dependence values (at 0°, 25°, and 65° C.) of the attenuation-current characteristics of these test specimens were measured. The results are shown in FIG. 9. With each specimen the peak current at which the peak of attenuation at 25° C. was attained and the maximum value of the variation in attenuation over the range of 0–65° C. at attenuation below 20 dB were determined. The results are summarized in FIG. 10. Although the individual samples gave favorable values of temperature dependence upon attenuation, the peak-current value at which the maximum attenuation was achieved was about 70 mA, as much as about 1.8 times greater than the values of the specimens fabricated in accordance with the present invention, suggesting the effectiveness of the present invention in lowering the current requirement.

EXAMPLE 2

Figure 11:
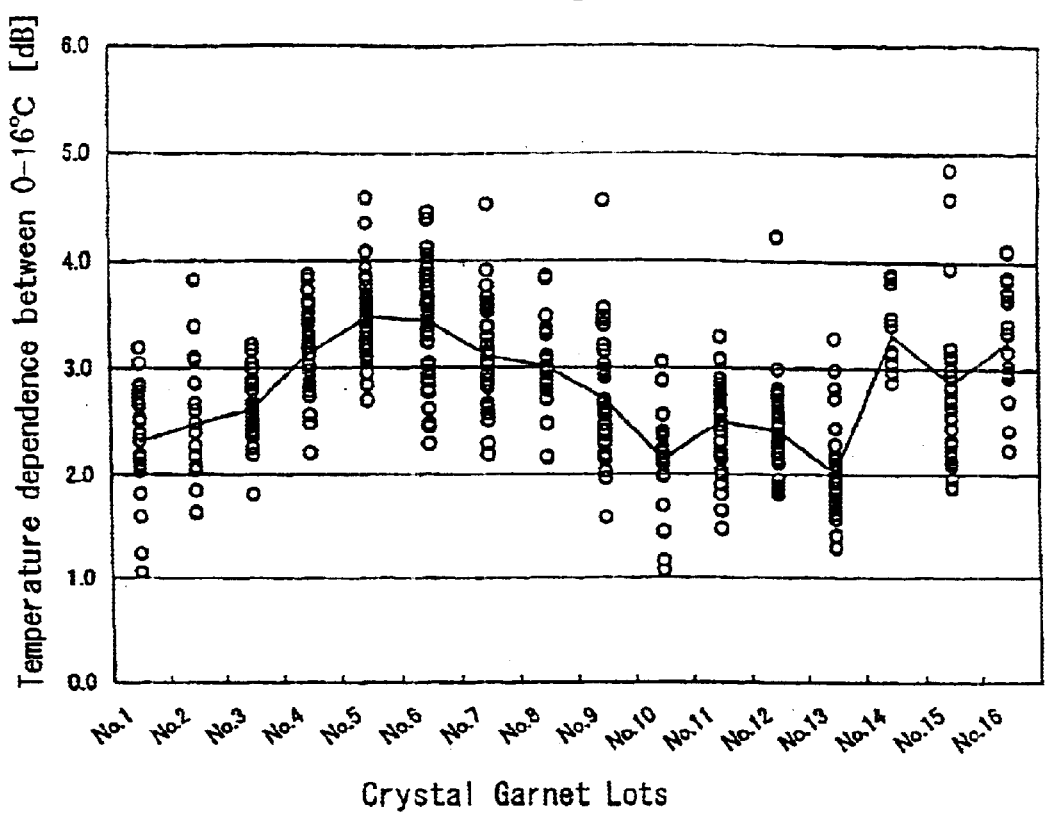
FIG. 11 shows the temperature dependence characteristics of a total of 444 optical attenuators fabricated from 16 lots of garnet crystals in accordance with the procedures described in the examples of the invention.

Following the procedure described in Example 1 of the present invention, a total of 444 optical attenuators were made from 16 lots of garnet crystals. Their temperature dependence values were determined, the results being summarized in FIG. 11. Despite the possibility of scatter of approximately ±5 deg. in crystal orientation as the scatter of fabrication including the tolerances in the cutting direction and in securing the elements in place, the figure indicates narrow scatter of temperature dependence and favorable reproducibility.

As has been described above in connection with FIGS. 1–11, the present invention improves the reproducibility of attenuation characteristics of optical attenuators with respect to applied variable magnetic fields, reduces the temperature dependence of the attenuation characteristics with respect to applied variable fields, and enhances the reproducibility. Further, the invention makes it possible to achieve low-current characteristics.

Figure 12:
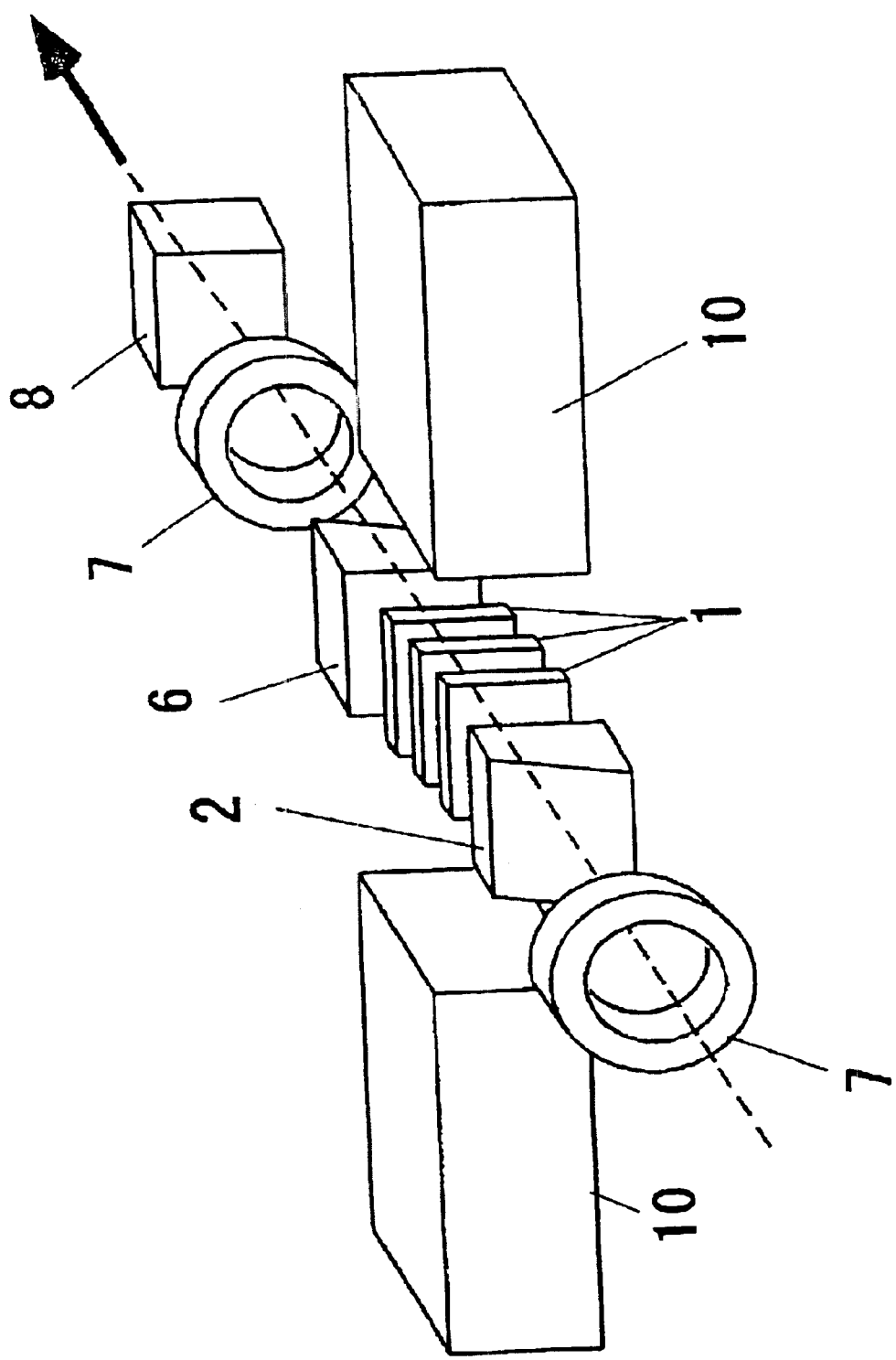
FIG. 12 is a schematic view showing the construction of an optical attenuator.

The present invention is also concerned with an optical attenuator which controls the quantity of light that transmits through a single crystal of garnet having a Faraday effect by applying two external magnetic fields, one fixed and the other variable, from opposite directions to the crystal and thereby making the Faraday rotation angle of the ray of light that transmits through the crystal variable. By way of example, a basic construction of an optical attenuator is shown in FIG. 12. The arrangement is such that a beam of light passes through a polarizer 2, a plurality of Faraday elements 1 each consisting of a garnet crystal, an analyzer 6, and a phase compensation prism 8, located in the order of mention, so that an attenuated beam of light emerges as indicated by an arrow. External magnetic field application means comprises a pair of permanent magnets 7, 7 disposed on opposite sides of the Faraday elements 1 and which jointly apply a magnetic field parallel to the axis of light and a pair of electromagnets 10, 10 (only the front ends of their yokes being shown) which apply a variable magnetic field perpendicular to the light axis. In order to attain independence from polarization, wedge-shaped polarization separation elements are used for the polarizer 2 and analyzer 6. Those elements are made of birefringent crystals. As a consequence, the incoming light beam is separated into ordinary and extraordinary rays in the polarizer 2 located on the incidence side of the Faraday elements (garnet crystals), and then in the polarized state the separate rays enter the garnet crystals. As the rays travel through the garnet crystals, their directions of polarization are rotated by the Faraday effect. This behavior is taught in the Registered U.S. Pat. No. 2,815,509. In brief, as they travel through the garnet crystals, the ordinary and extraordinary rays separated as a result of polarization pass different paths across the crystals. Thus, theoretically, different Faraday rotation angles of the two rays separated by polarization cause a PDL.

Figure 13:
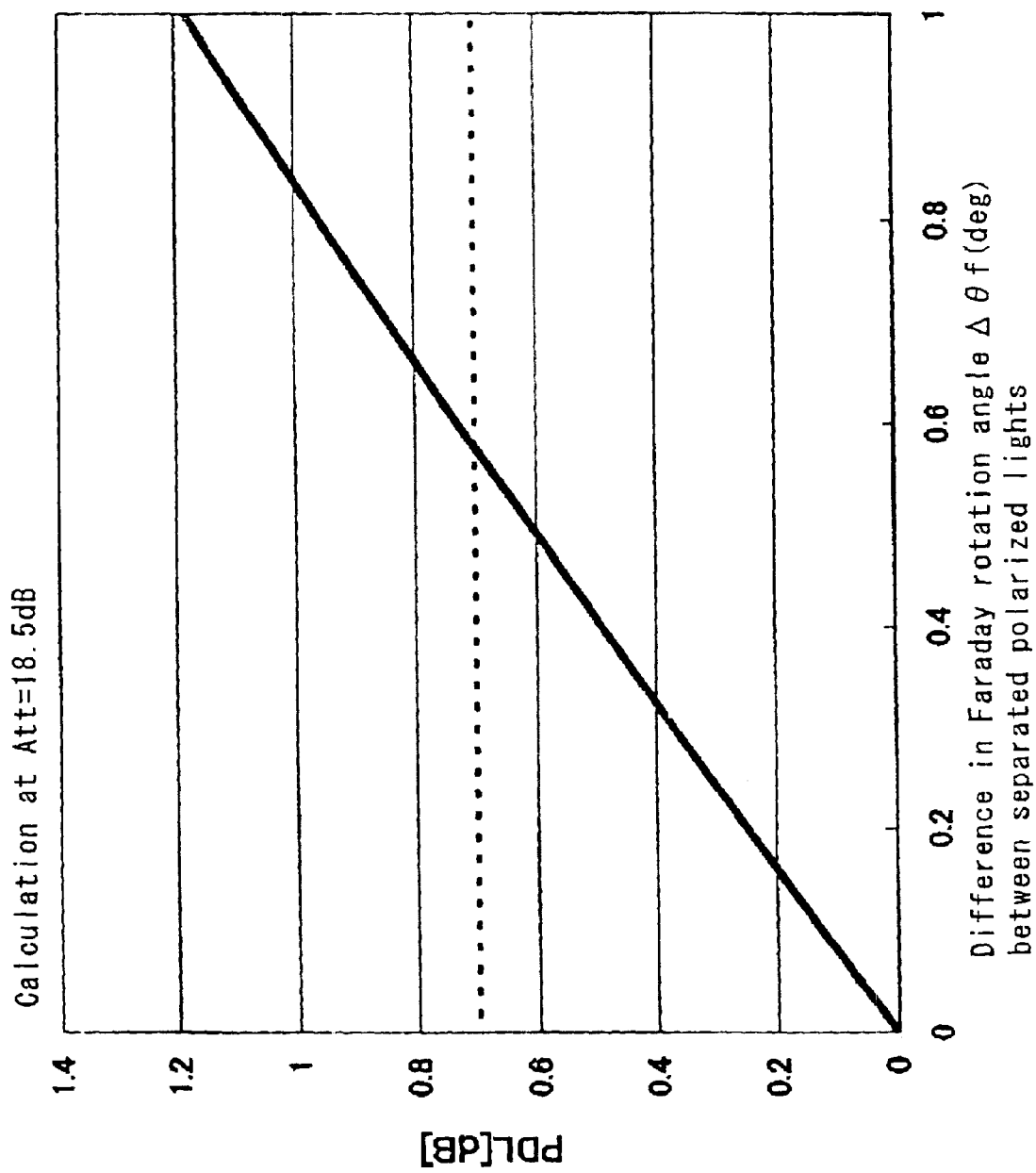
FIG. 13 gives the results of computation of the relation between PDL and the discrepancy between Faraday rotation angles of split light beams and PDL.

In FIG. 13 are graphically shown the results of calculation of the relation between PDL and the discrepancy between separated rays with an attenuation value of 18.5 dB. The relation is represented by a mathematical expression or Formula 1;

where $\phi$ is the relative angle of the optical axis of the wedge-shaped polarization separation elements, $\Delta\theta$ is the discrepancy between the Faraday rotation angles of ordinary and extraordinary rays, Att is the attenuation value, and $\theta fAtt$ is the Faraday rotation angle at which a desired attenuation value is attained:

$$PDL = |-10 \log\lfloor \cos^2\{\phi-(\theta_{fAtt}+\Delta\theta)\}\rfloor - Att| \quad \text{[Formula 1]}$$

The formula indicates that the PDL increases as the discrepancy between the Faraday rotation angles expands.

Ordinarily the angle of Faraday rotation varies with the external magnetic field that is applied to the single crystals of garnet. To reduce the discrepancy between the angles of Faraday rotation of the rays separated by polarization, therefore, it is necessary to apply as uniform a magnetic field to the crystals as possible. In reality, however, the strength of the variable magnetic field that is applied to the electromagnets is difficult to control, because the strength depends on various factors such as the size and shape of the yokes of the electromagnets and their relative position to the garnet crystals.

Figure 14:
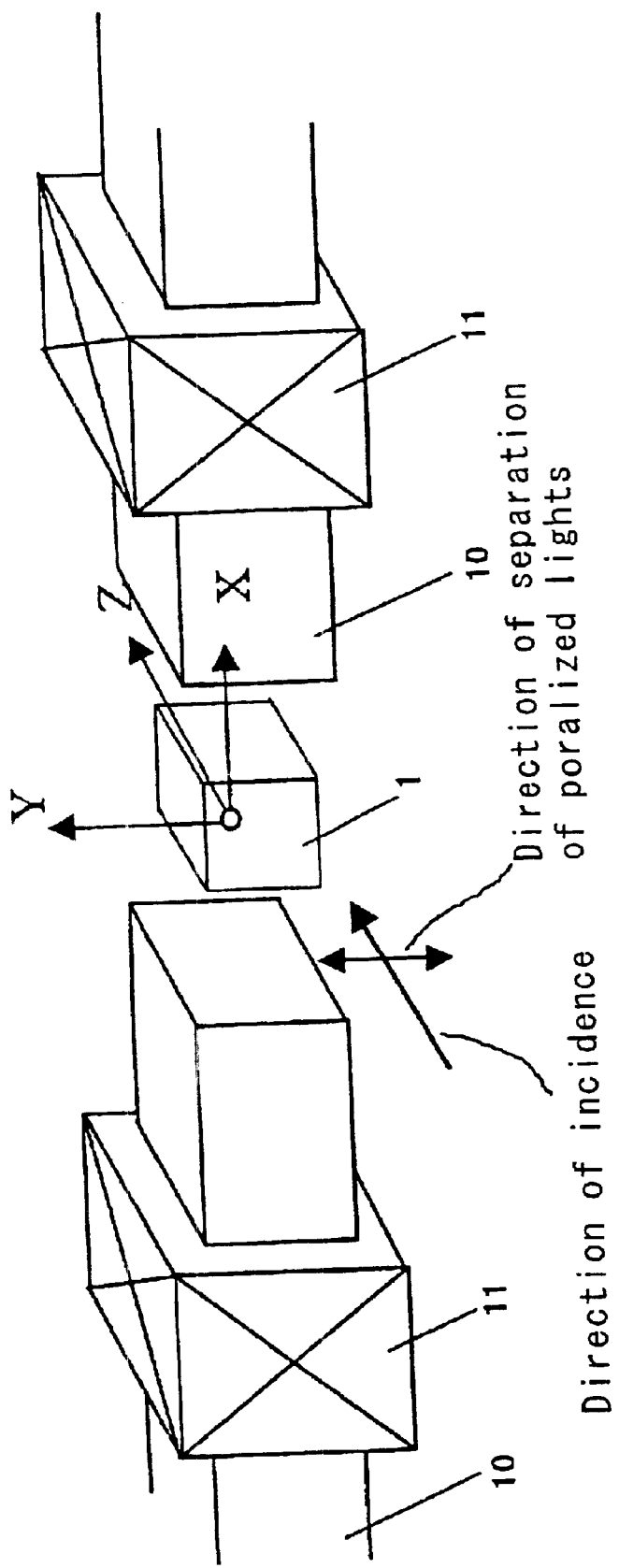
FIG. 14 shows the field application zone of electromagnets that apply a variable magnetic field.

A magnetic field application zone of electromagnets that apply a variable magnetic field (i.e., the zone where Faraday elements are disposed) is shown in FIG. 14. A variable current is passed through coils 11 of conductor wire wound on both yokes 10 to produce a variable magnetic field between the yokes. The variable magnetic field is applied to one or more Faraday elements of garnet crystal interposed in the region between the yokes so as to adjust the attenuation value of light.

Figure 15:
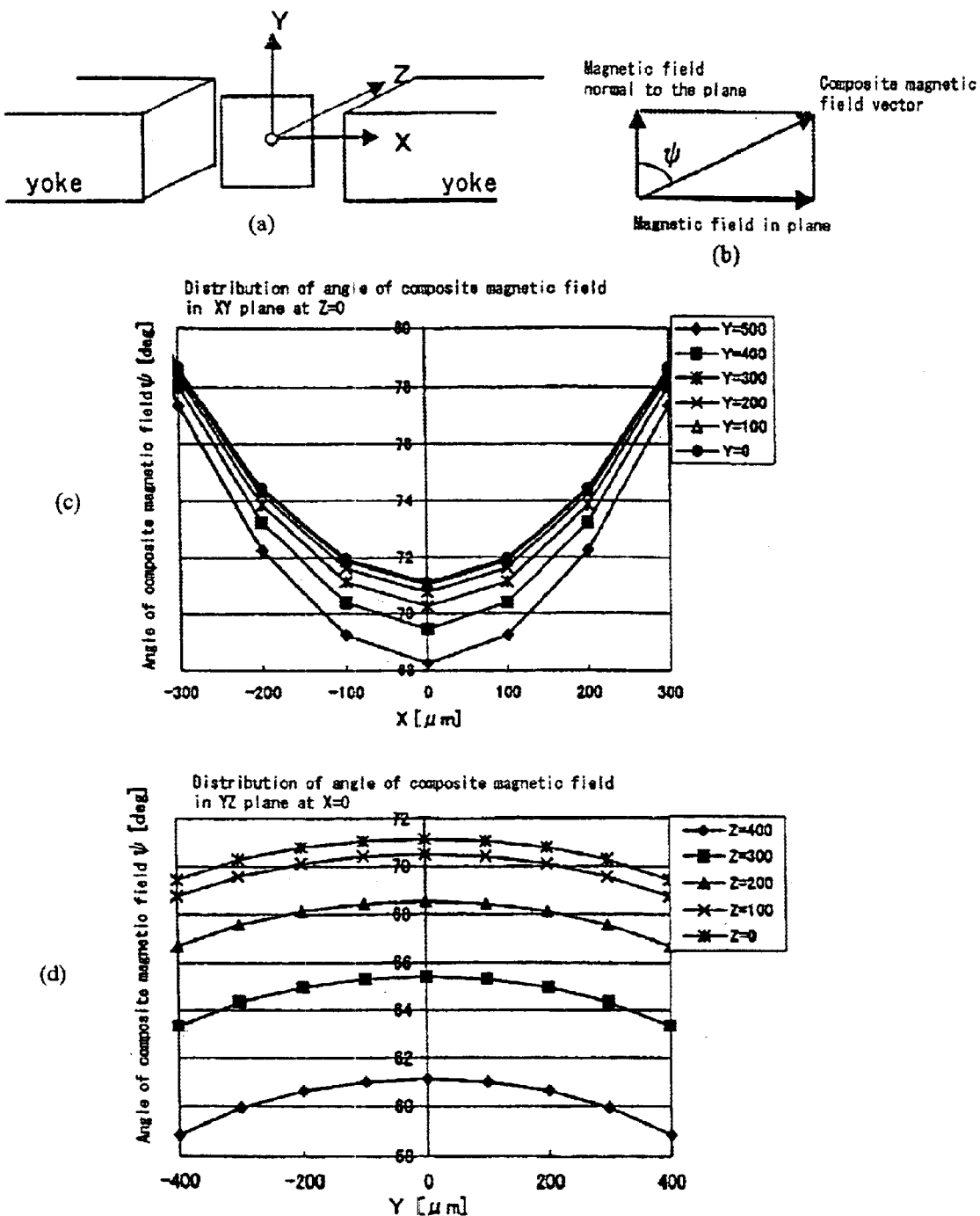
FIG. 15 gives the results of computation of magnetic field distribution in a field application zone.
Figure 16:
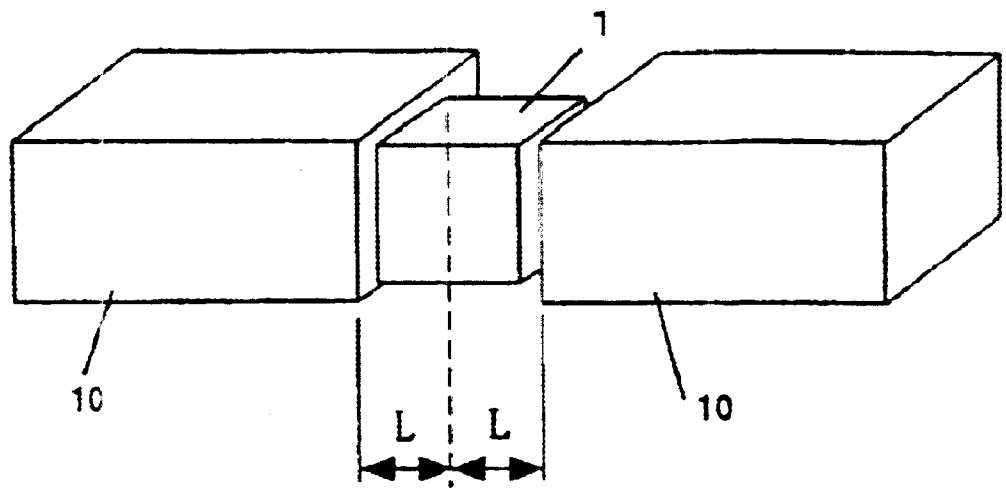
FIG. 16 illustrates samples of a symmetrical pair of electromagnet yokes and an asymmetrical pair of electromagnet yokes.
Figure 16:
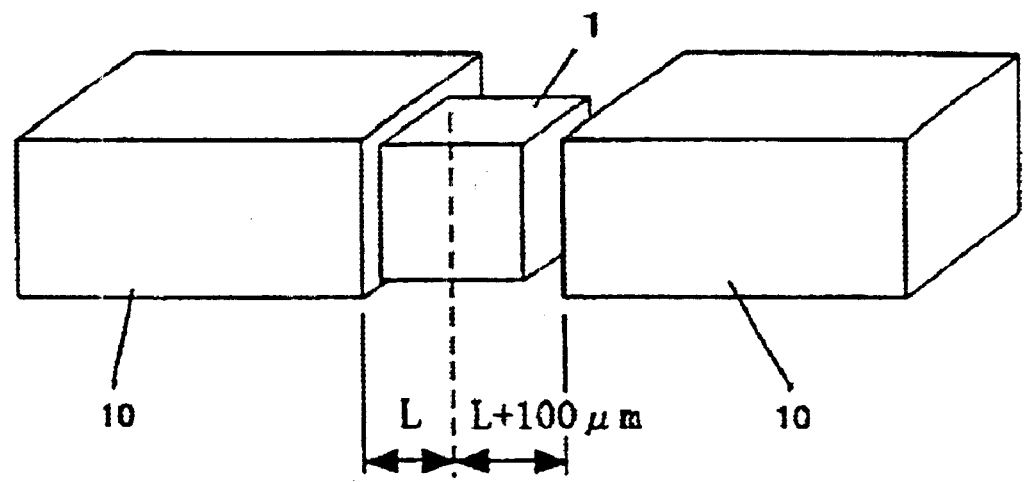

The angular distribution of the vector of the external magnetic field applied to this region was computed. The results are shown in FIG. 15. As conditions for the computation, the distance between the yokes 10, 10 of the two electromagnets was set to 1 mm, the cross sectional area of the front end of each yoke to 1×1 mm, the number of turns of wire in each coil to 1,500 turns, the diameter of the wire to 0.1 mm, and the electromagnet current to 70 mA. A model arrangement was made in which two permanent magnets 7, 7 were located at the front and rear of the yokes to apply a magnetic field parallel to the optical axis (see FIG. 12). The dimensions of the permanent magnets were 3.5 mm in outside diameter, 1.3 mm in inside diameter, and 1.0 mm long. The distance between the center of each yoke and the center of each permanent magnet was 3.5 mm. It will be appreciated that the most favorably distributed region is at and around the centers. For this reason it is presumed that, for the reduction of the PDL characteristic, the element should be located as precisely in the center between the electromagnet yokes as possible.

The above was experimentally confirmed. Experiments were made to see if the PDL characteristic is improved in a uniform magnetic field. Two sample models of optical attenuators, one having symmetrical electromagnetic yokes and the other asymmetrical electromagnetic yokes, were made. Each sample was evaluated in respect of the distributions of PDL and attenuation in the incidental plane. The symmetrical electromagnet yoke sample used left and right yokes arranged symmetrically and the asymmetrical electromagnet yoke sample used one yoke located about 100 $\mu$m more distant from the other yoke.

Figure 17:
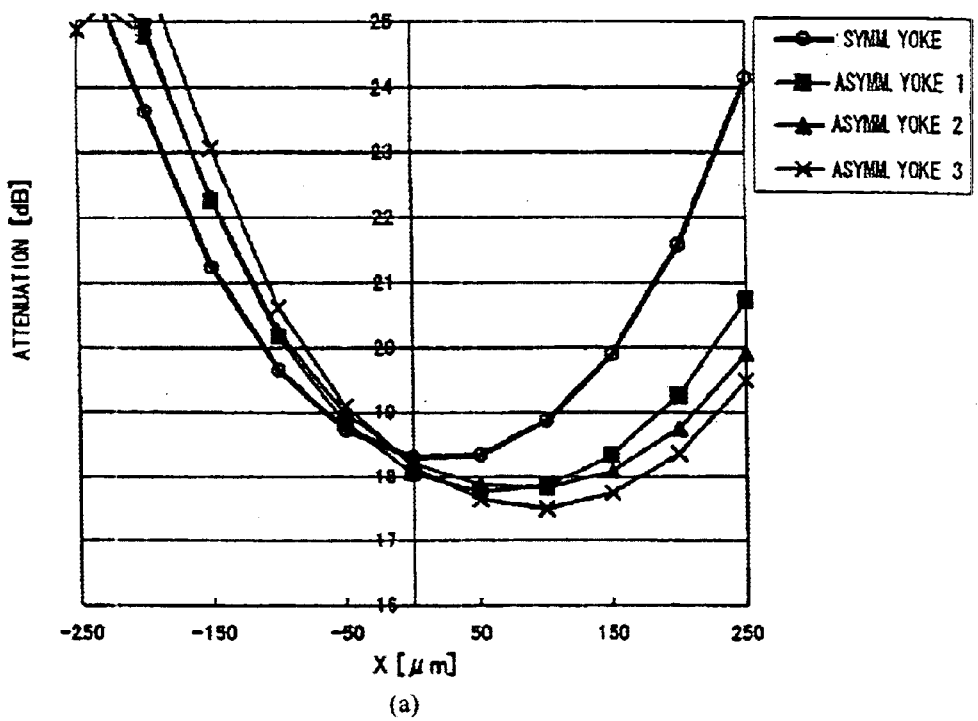
FIG. 17 gives the results of evaluation of the characteristics of distribution within the incidence area of PDL and attenuation in symmetrical and asymmetrical electromagnet yoke samples.
Figure 17:
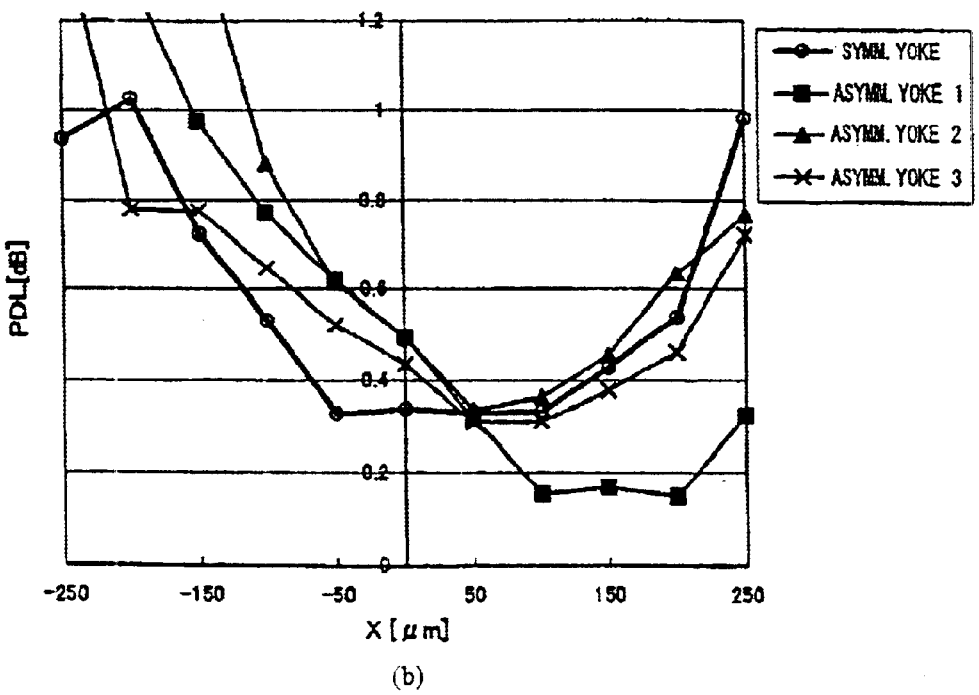

The evaluation results are graphically represented in FIG. 17. To sum up, the closer to the center between the yokes the less the attenuation was. With the asymmetrical yoke sample, the minimum peak was about 100 $\mu$m off the center. The results were in agreement with the results of magnetic field analysis in which the closer to the center between the yokes the smaller the absolute value of the magnetic field. The PDL distribution too became less as it approaches the center between the electromagnets. As with the attenuation, the minimum peak was also about 100 $\mu$m off the center. This indicates that in the center between electromagnets where the magnetic field distribution is favorable, PDL too is improved.

From the foregoing it is clear that a favorable distribution of the externally applied magnetic field in the Faraday elements is essential for the improvement in the PDL characteristic. For the improved field distribution it is also effective to locate the element as precisely in the center between the electromagnet yokes as possible and allow the front ends of the magnet yokes to have a cross sectional area greater than that of the Faraday element. In addition, the provision of a member for holding the Faraday element in position and of a stopper formed in the periphery of the member for the insertion of yokes improves the symmetry of the electromagnet yokes and enhance the PDL characteristic value. Further, the provision of the element-holding member formed with grooves in the periphery of the member to position the electromagnet yokes with respect to the optical axis makes it possible for the Faraday element to be disposed in the center between the electromagnet with respect to the optical axis direction. With the yokes of the electromagnets that apply the variable magnetic field, the larger the cross sectional area of the plane of each yoke end perpendicular to the direction of the variable field compared with the cross sectional area of the Faraday element perpendicular to the variable field, the better the uniformity of the magnetic field to which the Faraday element is subjected.

Moreover, the stopper formed in the element holder keeps the yokes out of contact with the element, enhancing the reliability against thermal expansion due to temperature changes and against changes with the lapse of time.

An optical attenuator of the basic construction illustrated in FIG. 12 was fabricated. The construction was such that a light beam indicated by an arrow could pass through a polarizer 2, a Faraday element 1 consisting of three plates of garnet crystal, an analyzer 6, and a phase compensation prism 8 to yield an attenuated light beam. The Faraday element 1 was located in such a way that the light beam could be incident perpendicularly to the (111) plane of the element. To this Faraday element was applied a magnetic field parallel to the light beam by means of two permanent magnets 7, 7 and a magnetic field normal to the light beam was applied by electromagnets 10,10. While the Faraday element 1 was being kept in a magnetically saturated state by means of the permanent magnets 7, 7, the current being supplied to the electromagnets 10, 10 was varied, whereby the angle of Faraday rotation of the transmitted light could be continuously varied and the quantity of the emerging light beam be changed. The relative angle of the polarization plane of the light passing through the polarizer 2 and the analyzer 6 each was 105 deg.

Figure 18:
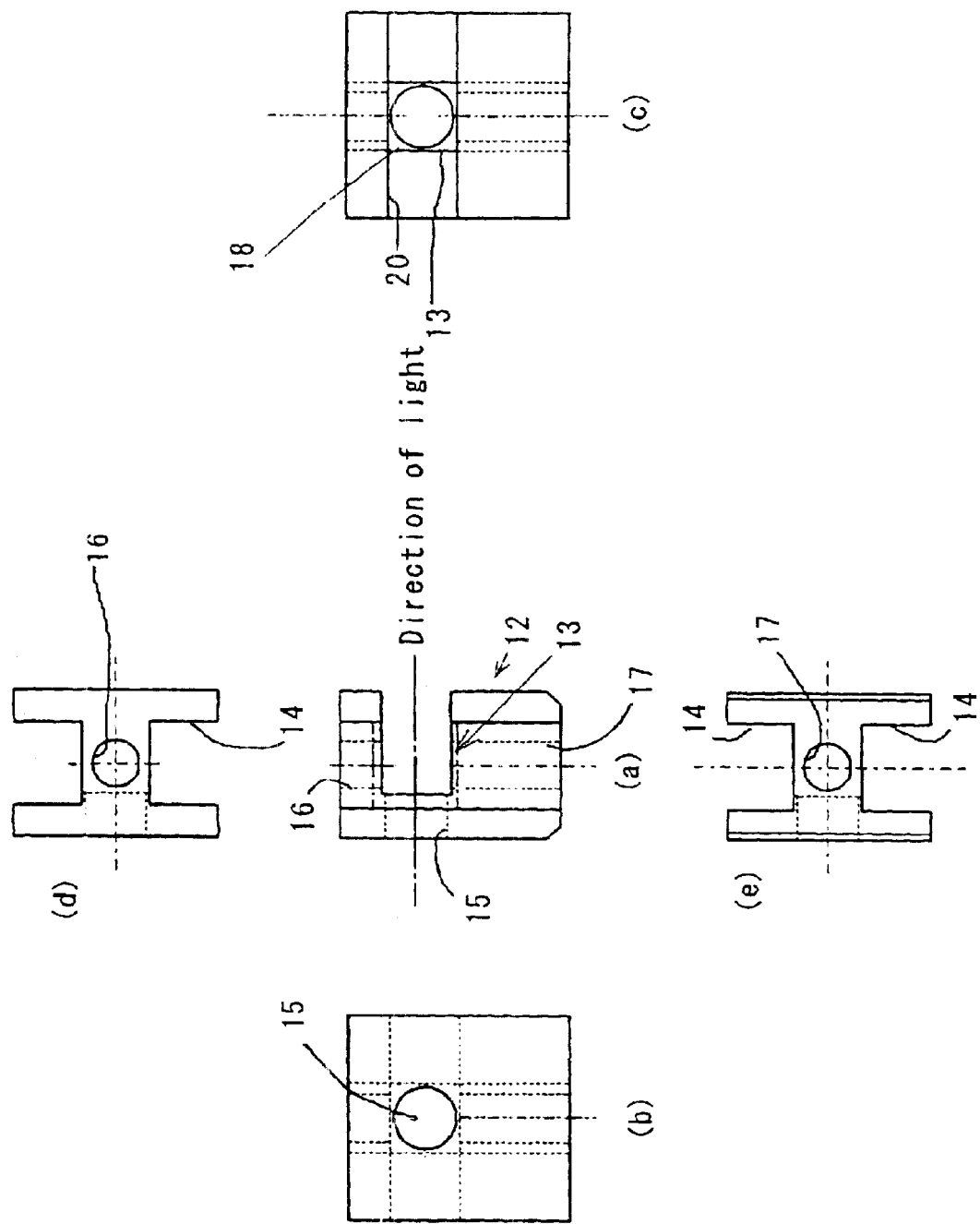
FIG. 18 depicts an element holder having a yoke stopper and yoke-positioning grooves; (a) being a left side view, (b) a front view, (c) a back view, (d) a plan view, and (e) a bottom view.

The Faraday element was joined securely to an element-securing holder 12 as shown in FIG. 18. To be more particular, the element holder 12 has a first groove 20 which extends across the optical axis, a Faraday element-holding stage 18 formed in the middle portion of the groove 20, an opening 15 formed in the Faraday element-holding stage 18 in the groove 20 and along the optical axis, and a pair of yoke-positioning grooves 14 formed close to the both sides of the Faraday element-holding stage 18 and extending normal to the optical axis across the first groove. With respect to the Faraday element-holding stage 18, there are two resin injection holes 16, 17 formed in the walls of the first groove 20, in alignment with each other. In the yoke-positioning grooves 14, the portion adjacent to the first groove 20 (the portion indicated by two-dot chain lines in FIG. 18(a)) constitutes a stopper portion 13 for the yokes. Unlike the counterpart of the prior art illustrated in FIG. 22, the first groove 20 serves as a groove for positioning the Faraday element, where the yokes are held in position by utilizing the yoke-positioning grooves 14 and the stopper portion 13. Steps formed between the first groove 20 and one side faces of the yoke-positioning grooves 14 as shown not only increases the area of the yoke stopper portion 13 but also locate the Faraday element in the centers of the yoked in the direction of the optical axis, thus making it possible to apply a uniform magnetic field to the Faraday element.

Figure 19:
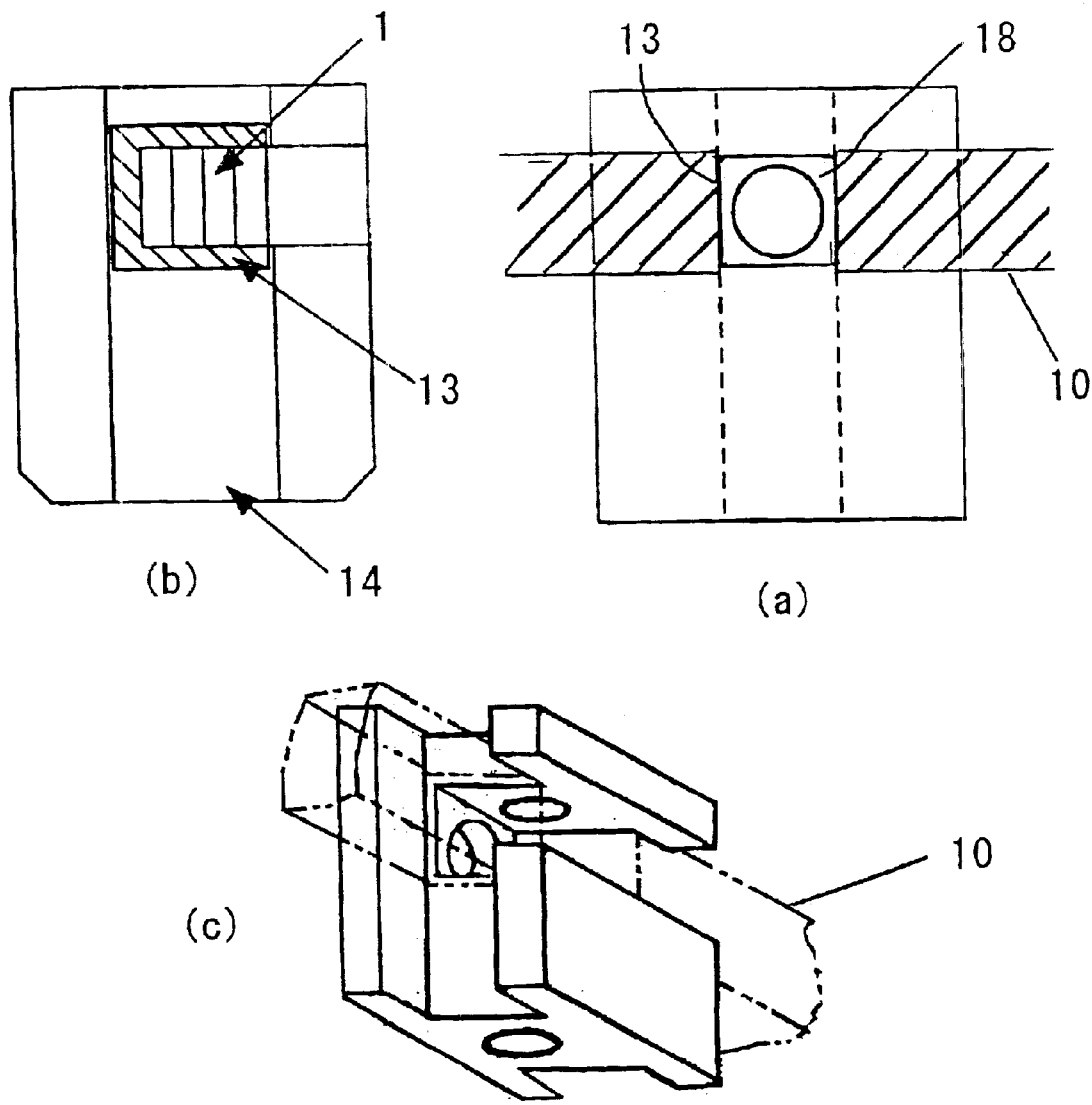
FIG. 19 presents schematic views showing how an element is joined to an element holder and how a pair of yokes are joined under pressure; (a) being a left side view, (b) a back view, and (c) a perspective view as seen from below the rear side.

As shown in FIG. 19, the Faraday element 1 is fitted in the Faraday element-holding stage 13 in the first groove 19, locat☐ing the element in alignment with the optical axis, and a curable resin is injected into the stage through the resin injection holes 16, 17 to secure the element in place. Next, the yokes 10 of the two electromagnets are fitted in the pair of yoke-positioning grooves 14 so as to sandwich the Faraday element in between. The front ends of the yokes are pressed against the yoke-positioning stopper portion at the bottom of the grooves, and the curable resin is injected into the grooves 14 to fix the yoke ends securely. In this manner the yoke ends are precisely positioned. Also, the both side walls of the yoke-positioning grooves 14 allow the yokes 10 to be positioned in the direction of the optical axis.

Further, as FIG. 18(a) and FIG. 19(b) indicate, the cross sectional area of the stopper portion 13 of the yoke-positioning grooves 14 is larger than that of the first groove 20, the distribution of the magnetic field applied to the Faraday element 1 is made all the more uniform.

As described above, the element holder according to the present invention is utilized in securing electromagnet yokes in place, whereby the symmetry of electromagnet yokes is enhanced. Moreover, because the yokes are kept out of contact with the element, the qualitative reliability of the assembly is improved. The electromagnet yokes used for the experiments had front end dimensions of 1.3 mm by 1.2 mm. The cross sectional area of the electromagnet yokes was set to a value about 1.7 times that of the element.

Figure 20:
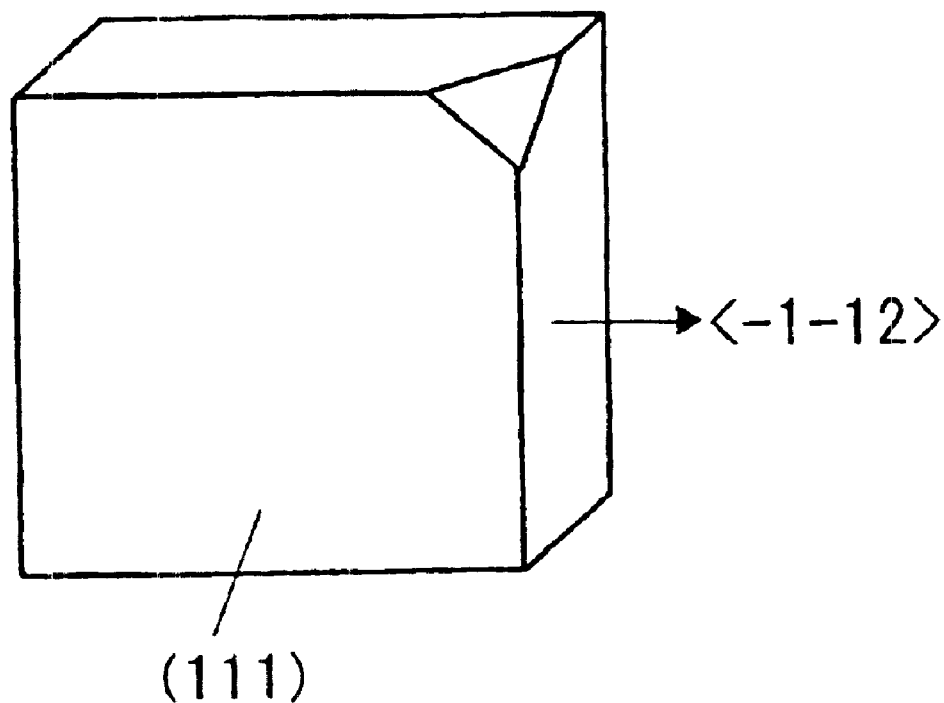
FIG. 20 is a view illustrating single crystal of garnet one millimeter square in size after a corner beveling.

The Faraday element was fabricated in the following way. A single crystal of garnet was grown on a nonmagnetic garnet substrate by the liquid phase epitaxial technique. With reference to the orientation flat surface formed on the nonmagnetic garnet substrate, the resulting crystal was slitted at intervals of 11 mm in parallel with and perpendicularly to the <−1−12> direction, and the upper right corner of the side of each slitted piece normal to the <−1−12> direction was beveled. Next, the substrate was removed by grinding, and the semifinished pieces were heat treated at 1030° C. in air for 20 hours. The heat treatment was done for the purpose of reducing the growth induced magnetic anisotropy. The pieces were then mirror polished to a finish thickness (about 0.3 mm) at which the angle of Faraday rotation is about 32 deg. Following this, nonreflective films were formed on both sides of the pieces. Next, the 11 mm-square garnet single crystal pieces formed with the nonreflective films were cut into chips 1 mm square in the directions parallel to and perpendicular to the four sides of each piece. The upper right of the side perpendicular to the <−1−12> direction of each chip was beveled (FIG. 20). The beveling is intended to clarify the crystal orientation of each chip after the scission. Three such 1 mm-square chips of garnet single crystal were used as Faraday elements.

The three Faraday elements were placed in the element holder having yoke stopper, and were bonded securely in position with ultraviolet-curing resin injected through the upper and lower holes 0.7 mm in diameter each. The Faraday elements were fixed after positioning with care taken not to allow them to come out of place. In fixing the electromagnets, they were bonded in place with their yoke ends pressed against the yoke stopper of the element holder. This enhanced the symmetry of the left and right electromagnet yokes and ensured the stability of the yoke-to-yoke distance.

Figure 21:
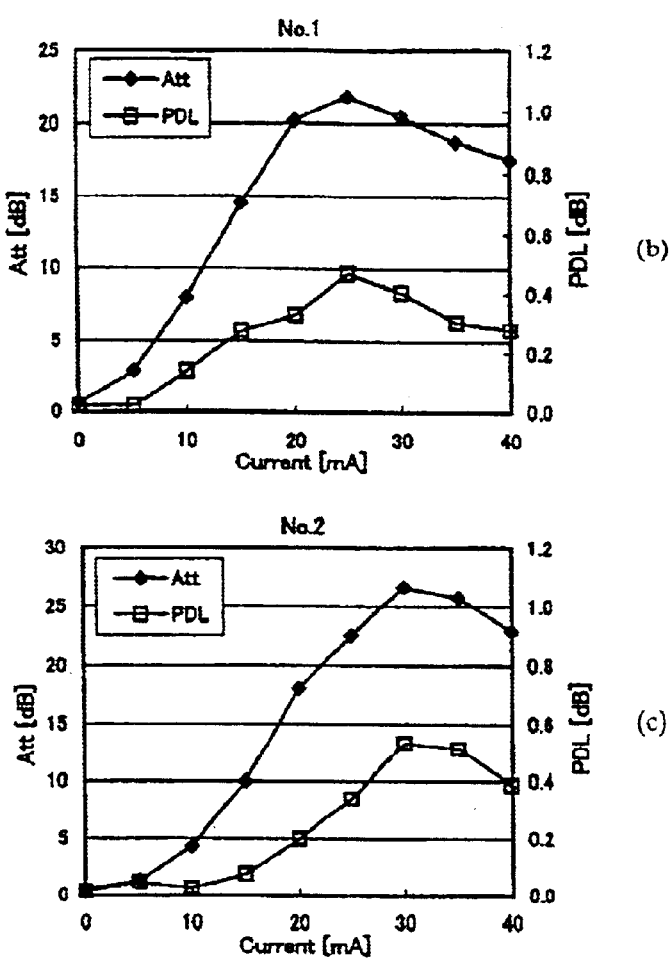
FIG. 21 gives characteristics, i.e., PDL and attenuation current characteristics and PDL values at the attenuation of 18.5 dB, of samples embodying the present invention.

With the optical attenuators thus experimentally fabricated using the element holder provided with a yoke stopper, their PDL and attenuation current characteristics and the PDL values at the attenuation of 18.5 dB were evaluated. The results are given in FIG. 21. As for the PDL current characteristics, the maximum PDL value at the current level that gave the attenuation peak was of the order of 0.5 dB. The PDL value at the attenuation of 18.5 dB, as the average of 14 sample attenuators fabricated, was 0.25 dB, a favorable characteristic value.

Figure 22:
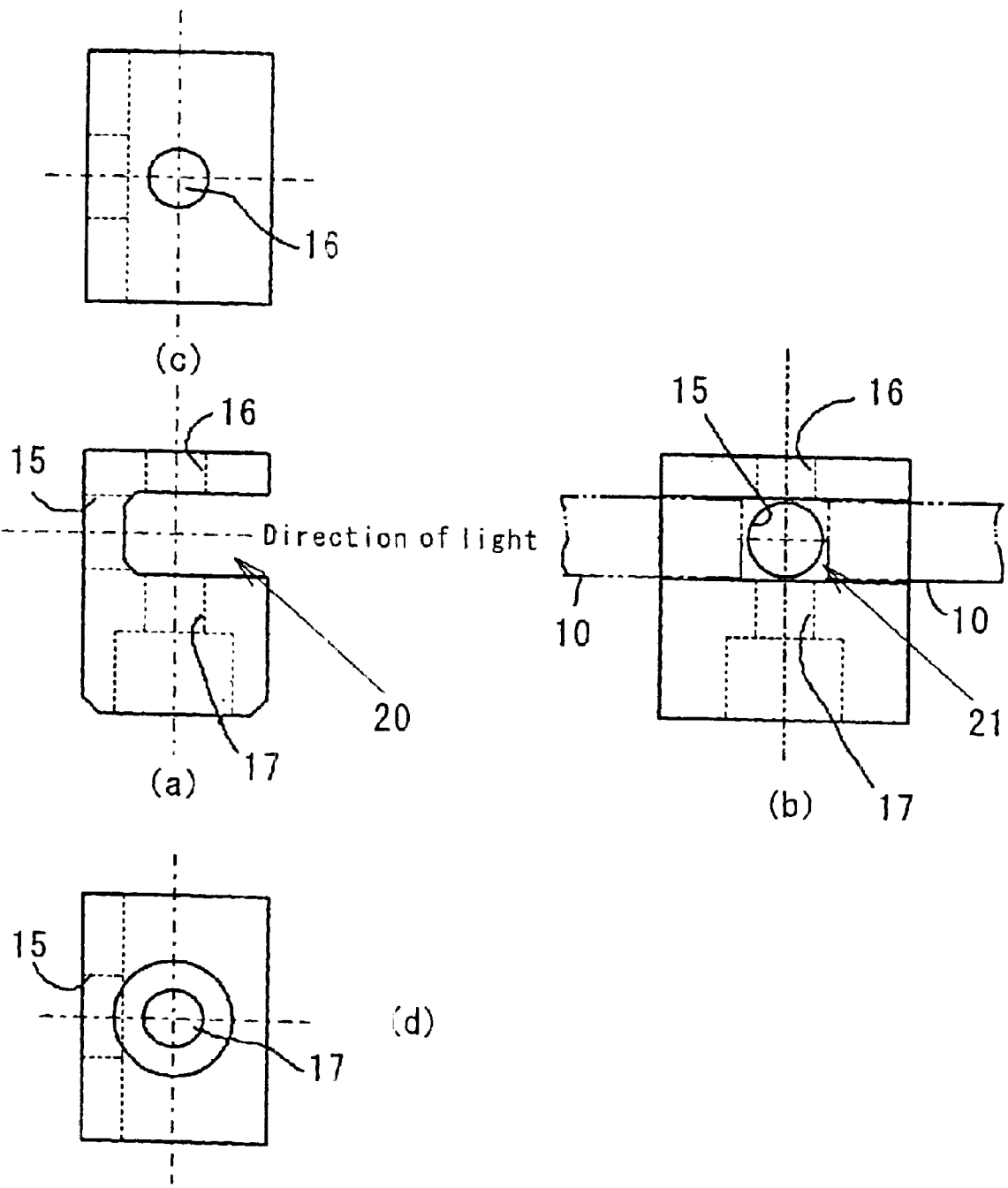
FIG. 22 illustrates an element holder not provided with a yoke stopper; (a) being a right side view, (b) a back view, (c) a plan view, and (d) a bottom view.
Figure 23:
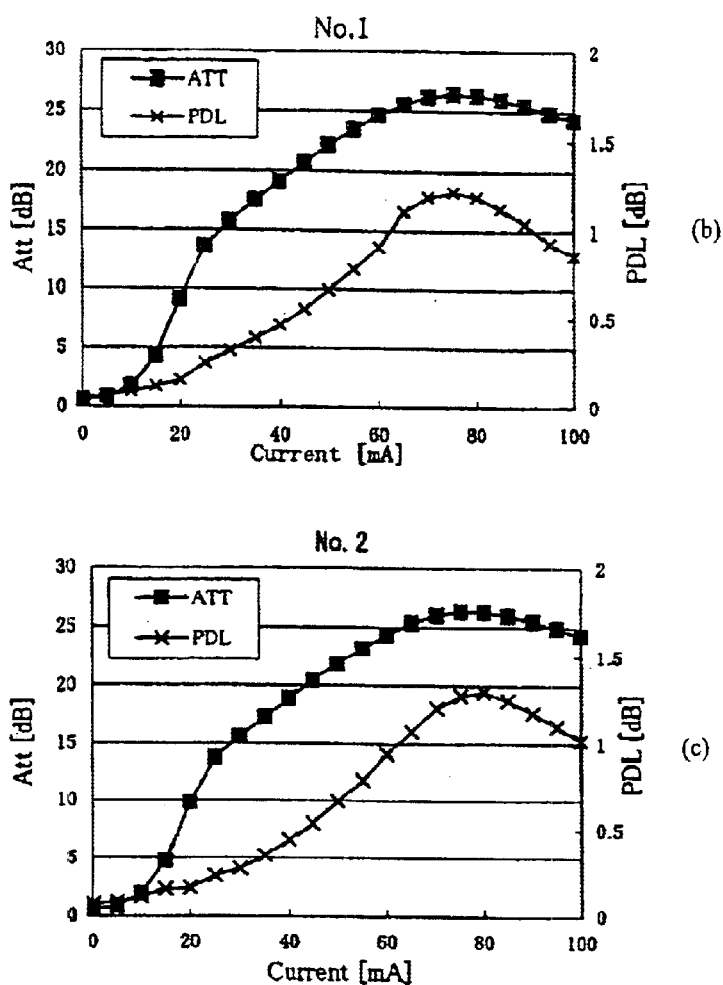
FIG. 23 gives characteristics, i.e., PDL and attenuation current characteristics and PDL values at the attenuation of 18.5 dB, of samples in comparative examples.

By way of comparison, optical attenuators were made using an element holder not provided with a yoke stopper as shown in FIG. 22 and employing electromagnets with yoke end dimensions of 1.0 mm by 1.2 mm. With these attenuators, the PDL and attenuation current characteristics and PDL values at an attenuation of 18.5 dB were evaluated. FIG. 23 summarizes the results. In respect of the PDL current characteristics, the maximum PDL value at the current level that yielded the attenuation peak exceeded 1.2 dB. The average PDL value of 9 samples trially manufactured was 0.53 dB at the attenuation of 18.5 dB. The individual PDL values were about twice the values of the samples made in accordance with the present invention, and this demonstrates the effectiveness of the invention in improving the PDL characteristic.

As has been described above in connection with FIGS. 12–23, the present invention renders the variable magnetic field applicable to Faraday elements uniform and thereby improves the PDL characteristic.

| [Description of symbols] | |
|---|---|
| 1, 3, 4, 5 | Faraday elements |
| 2 | Polarizer |
| 6 | Analyzer |
| 7 | Permanent magnet |
| 8 | Phase compensation prism |
| 10 | Electromagnet |
| 11 | Coil of electromagnet |
| 13 | Yoke stopper |
| 14 | Yoke-positioning groove |
| 15 | Opening |
| 16, 17 | Resin-filling ports |

| [Description of symbols] | |
|---|---|
| 18 | Element-holding stage |
| 20 | Element holder |

What is claimed is:

1. An optical attenuator which controls the angle of Faraday rotation of a light beam that passes through a single crystal of garnet having the Faraday effect by applying two external magnetic fields, fixed and variable, from two different directions, characterized in that at least one garnet crystal having a Faraday effect is used as a Faraday element, and a member for holding the Faraday element in place has a stopper to position the front ends of yokes of electromagnets that apply the variable magnetic field to and around the holder, with respect to the direction of field application, the member for holding the Faraday element in place having a pair of positioning grooves to position the front ends of yokes of electromagnets that apply the variable magnetic field to and around the holder, with respect to the direction of light beam.

2. An optical attenuator which controls the angle of Faraday rotation of a light beam that passes through a single crystal of garnet having the Faraday effect by applying two external magnetic fields, fixed and variable, from two different directions, characterized in that at least one garnet crystal having a Faraday effect is used as a Faraday element, and a member for holding the Faraday element in place has a stopper to position the front ends of yokes of electromagnets that apply the variable magnetic field to and around the holder, with respect to the direction of field application, the yokes of the electromagnets that apply the variable magnetic field having a front end plane each perpendicular to the direction of the variable field with a cross sectional area no less than 1.7 times that of the plane of the Faraday element perpendicular to the direction of the variable field.

3. An optical attenuator comprising a member formed with a first groove extending across the optical axis and also formed with an opening open to the first groove along the optical axis, a Faraday element disposed in the first groove in alignment with the optical axis, said member having a pair of second grooves formed on both sides of, and close to, the Faraday element, said second grooves extending across the first groove and in the direction normal to the optical axis, and a pair of electromagnets that produce a variable magnetic field, said magnets having yokes the ends of which are fitted in the pair of second grooves on both sides of the Faraday element, the bottoms of the second grooves serving as a stopper for positioning the front ends of the yokes.

* * * * *